United States Patent
Cinader, Jr. et al.

(10) Patent No.: US 12,263,058 B2
(45) Date of Patent: Apr. 1, 2025

(54) PREFORMED ORTHODONTIC ALIGNER ATTACHMENTS

(71) Applicant: Solventum Intellectual Properties Company, Maplewood, MN (US)

(72) Inventors: David K. Cinader, Jr., Woodbury, MN (US); Richard E. Raby, Lino Lakes, MN (US); Joseph R. Dufour, Cottage Grove, MN (US); Daniel J. Skamser, Ham Lake, MN (US); Jeremy A. Schmoll, Pine Island, MN (US); Michael K. Domroese, Woodbury, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 270 days.

(21) Appl. No.: 17/784,736

(22) PCT Filed: Dec. 17, 2020

(86) PCT No.: PCT/IB2020/062132
§ 371 (c)(1),
(2) Date: Jun. 13, 2022

(87) PCT Pub. No.: WO2021/130624
PCT Pub. Date: Jul. 1, 2021

(65) Prior Publication Data
US 2023/0009985 A1    Jan. 12, 2023

Related U.S. Application Data

(60) Provisional application No. 62/954,278, filed on Dec. 27, 2019.

(51) Int. Cl.
*A61C 7/14* (2006.01)
*A61C 7/00* (2006.01)
*A61C 7/16* (2006.01)

(52) U.S. Cl.
CPC .............. *A61C 7/146* (2013.01); *A61C 7/002* (2013.01); *A61C 7/16* (2013.01)

(58) Field of Classification Search
CPC ........... A61C 7/146; A61C 7/002; A61C 7/16; A61C 7/14; A61C 7/12
(Continued)

(56) References Cited

U.S. PATENT DOCUMENTS

| 5,055,039 A | 10/1991 | Abbatte et al. |
| 7,234,934 B2 | 6/2007 | Rosenberg |

(Continued)

FOREIGN PATENT DOCUMENTS

| EP | 2266491 A1 | 12/2010 |
| EP | 2015699 B1 | 11/2014 |

(Continued)

OTHER PUBLICATIONS

International Search Report for PCT Application No. PCT/IB2020/062132 mailed on Feb. 16, 2021, 7 pages.

*Primary Examiner* — Ralph A Lewis
*Assistant Examiner* — Mirayda A Aponte

(57) ABSTRACT

The present disclosure describes articles, systems, and techniques including an additive manufactured orthodontic attachment including a body defining a retaining member configured to retain the article in a recess defined by a shell of a transfer tray; a coupling portion configured to engage a tool for insertion of the attachment into the recess of the transfer tray; and a bonding surface configured to bond the attachment to a portion of an outer surface of a tooth of a patient.

20 Claims, 21 Drawing Sheets

(58) Field of Classification Search
USPC .......................................... 433/3, 6, 18, 24
See application file for complete search history.

(56) References Cited

U.S. PATENT DOCUMENTS

| | | |
|---|---|---|
| 8,303,302 B2 | 11/2012 | Teasdale |
| 9,205,601 B2 | 12/2015 | Desimone et al. |
| 9,360,757 B2 | 6/2016 | Desimone et al. |
| 10,052,177 B2 | 8/2018 | Andreiko |
| 10,383,706 B2 | 8/2019 | Portalupi |
| 10,869,738 B2 | 12/2020 | Witte |
| 10,993,784 B2 | 5/2021 | Dickenson |
| 2004/0219471 A1* | 11/2004 | Cleary ............... A61C 7/146 433/24 |
| 2007/0031791 A1 | 2/2007 | Cinader et al. |
| 2009/0280450 A1 | 11/2009 | Kuo |
| 2013/0029285 A1 | 1/2013 | Teasdale |
| 2015/0313687 A1 | 11/2015 | Blees et al. |
| 2016/0256240 A1 | 9/2016 | Shivapuja et al. |
| 2016/0302884 A1 | 10/2016 | Paehl |
| 2016/0346063 A1 | 12/2016 | Schulhof |
| 2017/0231721 A1 | 8/2017 | Akeel et al. |
| 2017/0319296 A1 | 11/2017 | Webber et al. |
| 2018/0325626 A1 | 11/2018 | Huang |
| 2019/0377327 A1 | 12/2019 | Griffin, III et al. |
| 2019/0388189 A1* | 12/2019 | Shivapuja ............. A61C 7/002 |
| 2021/0196436 A1 | 7/2021 | Raby et al. |
| 2021/0393376 A1 | 12/2021 | Wu |
| 2022/0183795 A1 | 6/2022 | Webber |

FOREIGN PATENT DOCUMENTS

| | | | |
|---|---|---|---|
| WO | 2006062613 A1 | 6/2006 | |
| WO | WO-2007067554 A2 * | 6/2007 | ............... A61C 7/02 |
| WO | 2014078537 A1 | 5/2014 | |
| WO | 2016191162 A1 | 12/2016 | |
| WO | 2016191534 A1 | 12/2016 | |
| WO | 2018231583 A1 | 12/2018 | |
| WO | 2019048963 A1 | 3/2019 | |
| WO | 2019238758 A1 | 12/2019 | |
| WO | 2020099990 A1 | 5/2020 | |
| WO | 2020157598 A1 | 8/2020 | |

* cited by examiner

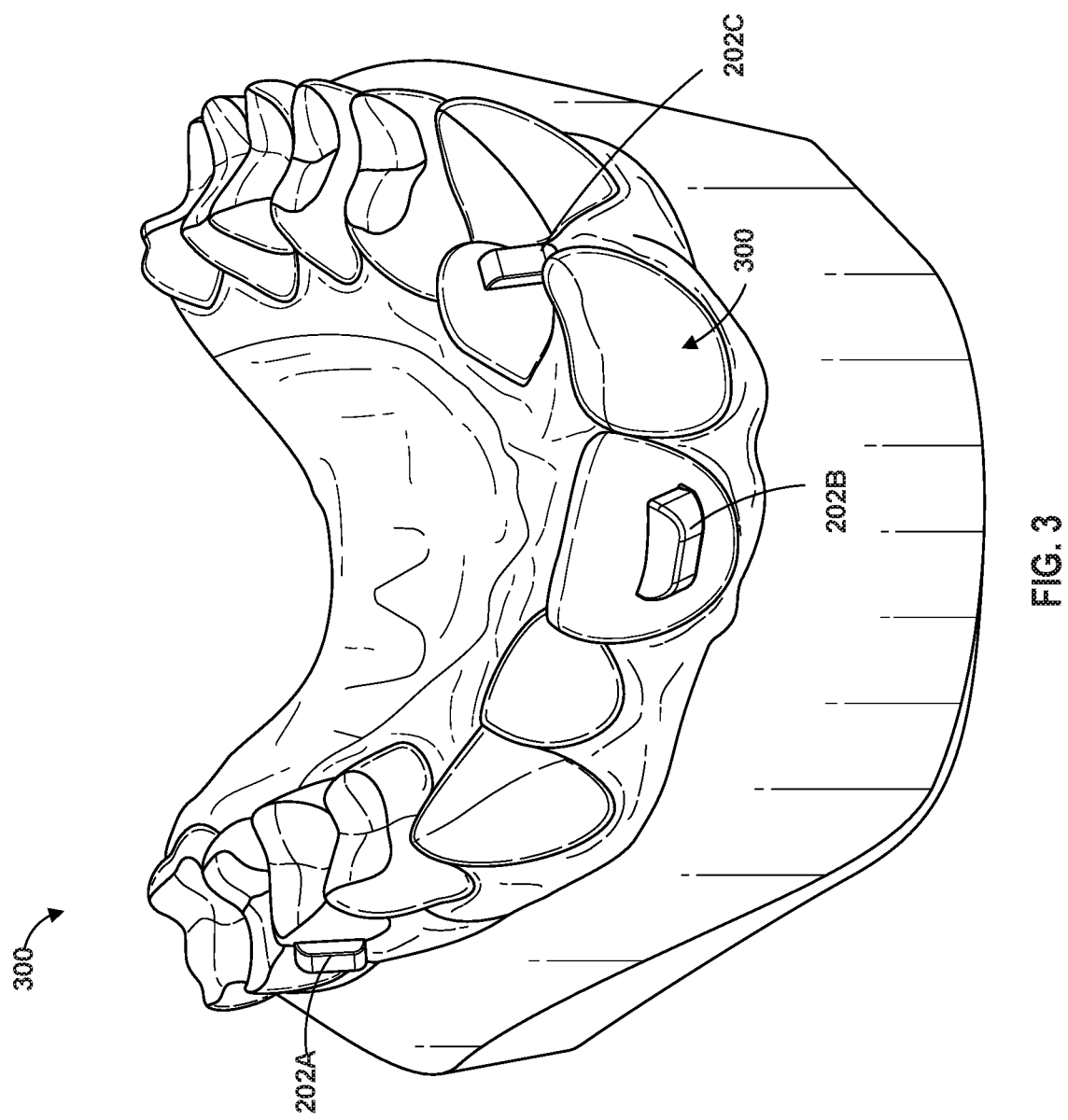

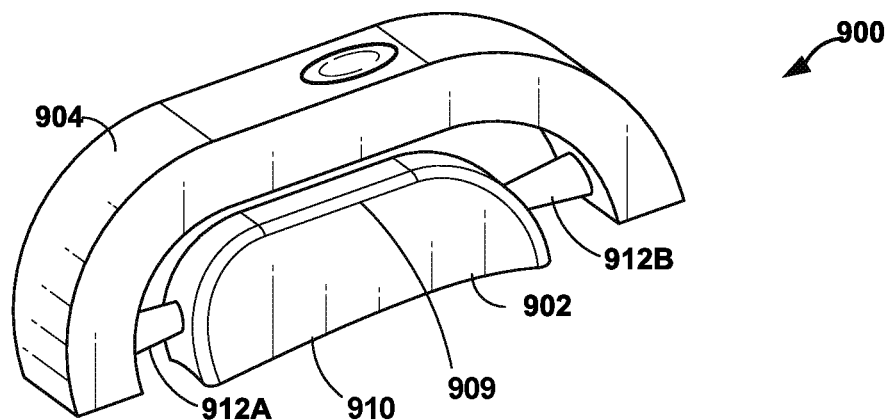
FIG. 9A
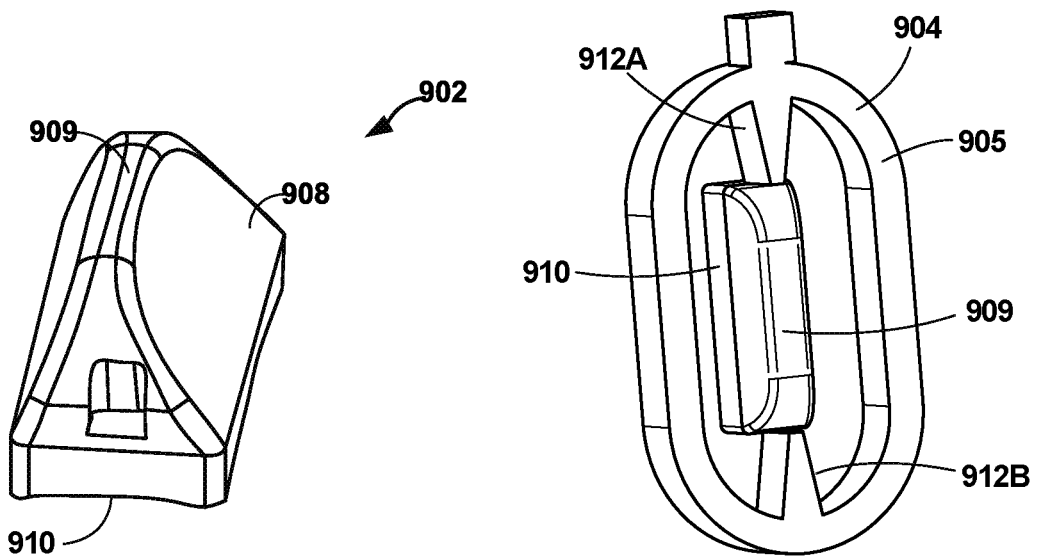
FIG. 9B
FIG. 9C

PREFORMED ORTHODONTIC ALIGNER ATTACHMENTS

CROSS REFERENCE TO RELATED APPLICATIONS

This application is a national stage filing under 35 U.S.C. 371 of PCT/IB2020/062132, filed 17 Dec. 2020, which claims the benefit of U.S. Provisional Application No. 62/954,278, filed 27 Dec. 2019, the disclosures of which are incorporated by reference in their entireties herein.

TECHNICAL FIELD

The present disclosure generally to additive manufactured articles, their preparation, and use.

BACKGROUND

The field of orthodontics relates to repositioning a patient's teeth for improved function and aesthetic appearance. Orthodontic devices and treatment methods generally involve the application of forces to move teeth into a proper bite configuration, or occlusion. As one example, orthodontic treatment may involve the use of slotted appliances, known as brackets, which are fixed to the patient's anterior, cuspid, and bicuspid teeth. An archwire is typically placed in the slot of each bracket and serves as a track to guide movement of the teeth to desired orientations. The ends of the archwire are usually received in appliances known as buccal tubes that are secured to the patient's molar teeth. Such dental appliances remain in the mouth of the patient and are periodically adjusted by an orthodontist to check the process and maintain the proper force on the teeth until proper alignment is achieved.

Orthodontic treatment may also involve the use of alignment trays, such as clear or transparent, polymer-based tooth positioning trays, often referred to as clear tray aligners (CTAs). For example, orthodontic treatment with CTAs may include forming a tray having shells that engage one or more teeth. Each shell may be deformed from an initial position of a tooth, e.g., a malocclusion position. The deformed position of a respective shell of the CTA may apply a force to a respective tooth toward a desired position of the tooth that is an intermediate position between the initial position and a final position resulting from the orthodontic treatment. In some examples, small attachments may be bonded to the teeth to improve force application or achieve desired tooth movements.

SUMMARY

The present disclosure generally relates to additive manufactured articles including orthodontic attachments, their preparation, and use. Generally, orthodontic attachments may be bonded to the teeth by a direct bonding procedure or an indirect bonding procedure. In the direct bonding procedure, the appliance is commonly grasped with a pair of tweezers or other hand instrument and placed by the practitioner on the surface of the tooth in its desired location, using a quantity of adhesive to fix the appliance to the tooth. In the indirect bonding procedure, a transfer tray is constructed with wall sections having a shape that matches the configuration of at least part of the patient's dental arch, and appliances such as orthodontic brackets are releasably connected to the tray at certain, predetermined locations. After an adhesive is applied to the base of each appliance, the tray is placed over the patient's teeth and remains in place until the adhesive has hardened. The tray is then detached from the teeth as well as from the appliances such that the appliances previously connected to the tray are bonded to the respective teeth at their intended, predetermined locations.

Indirect bonding techniques offer several advantages over direct bonding techniques. For example, it is possible with indirect bonding techniques to bond a plurality of appliances to a patient's dental arch simultaneously, thereby avoiding the need to bond each appliance in individual fashion. Additionally, or alternatively, the transfer tray may improve accuracy of attachment placement. The increased placement accuracy of the appliances that is often afforded by indirect bonding procedures helps ensure that the patient's teeth are moved to their proper, intended positions at the conclusion of treatment. Due to their small size and shape, attachments may be difficult to manipulate for placement in a transfer tray. The described orthodontic attachments may facilitate positioning in a transfer tray.

In some examples, the disclosure describes an additive manufactured article that includes a body defining a retaining member configured to retain the article in a recess defined by a shell of a transfer tray; a coupling portion configured to engage a tool for insertion of the attachment into the recess of the transfer tray; and a bonding surface configured to bond the attachment to a portion of an outer surface of a tooth of a patient.

In some examples, the disclosure describes a system for indirect bonding of orthodontic attachments, the system including an appliance body defining a shell configured to receive an outer surface of a tooth of a patient, wherein the appliance body defines a recess within the shell; and an additive manufactured orthodontic article including a body defining a retaining member configured to retain the article in the recess of the appliance body; a coupling portion configured to engage a handling tool for insertion of the article into the recess; and a bonding surface configured to bond the body of the article to a portion of the outer surface of the tooth.

In some examples, the disclosure describes a method of making an additive manufactured orthodontic attachment, that includes obtaining a photopolymerizable material; and selectively curing the photopolymerizable material to form an additive manufactured orthodontic article that includes a body defining a retaining member configured to retain the attachment in a recess defined by a shell of a transfer tray; a coupling portion configured to engage a tool for insertion of the attachment into the recess of the transfer tray; and a bonding surface configured to bond the attachment to a portion of an outer surface of a tooth of a patient.

The details of one or more examples of this disclosure are set forth in the accompanying drawings and the description below. Other features, objects, and advantages of this disclosure will be apparent from the description and drawings, and from the claims.

BRIEF DESCRIPTION OF DRAWINGS

FIG. 3 is a conceptual diagram illustrating a plurality of attachments on a dentition of a patient.

FIG. 9A is a conceptual diagram illustrating an example additive manufactured orthodontic article.

FIG. 9B is a conceptual diagram illustrating an example orthodontic article.

FIG. 9C is a conceptual diagram illustrating an example orthodontic article.

Figure 1:
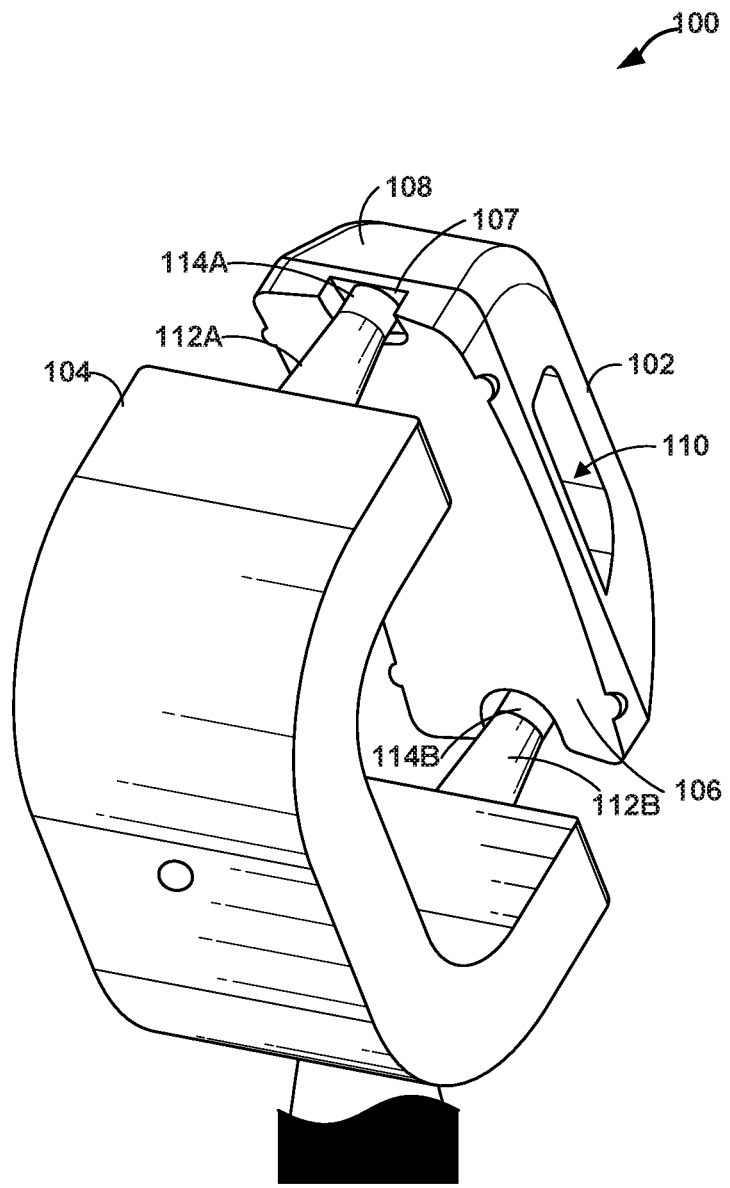
FIG. 1 is a conceptual diagram illustrating an example additive manufactured orthodontic article including an attachment and a coupling portion.

Repeated use of reference characters in the specification and drawings is intended to represent the same or analogous features or elements of the disclosure. It should be understood that numerous other modifications and examples can be devised by those skilled in the art, which fall within the scope and spirit of the principles of the disclosure. The figures may not be drawn to scale.

DETAILED DESCRIPTION

The disclosed articles, systems, and techniques include additive manufactured tooth attachments configured to facilitate placement into a transfer tray. The attachments may have a custom-formed shape that is unique to a particular application, patient, tooth, and/or region of a tooth. In some examples, the attachments may be integrally formed with a coupling portion, such as a handle coupled to the attachment via one or more frangible section, recesses configured to receive a portion of a handling tool, or the like. The coupling portion may improve handling of the attachment for placement into a transfer tray. For example, the transfer tray may include a body defining a shell configured to receive an outer surface of a tooth of a patient and a recess extending away from a surface defining shell. Once placed, the handle may be removed from the attachment at the frangible section. In some examples, the attachment may include one or more retaining members configured to retain the attachment in the recess of the body.

Once placed in the transfer tray, the attachments are secured for application of an adhesive, such as a dental adhesive, an orthodontic adhesive, a composite restorative material, or the like, to a bonding surface of the attachments. For example, the attachments and transfer tray may define a pocket at the bonding surface of the attachment, which may be filled with the adhesive. In some examples, by defining the pocket with the bonding surface of the attachment and adjacent body of the transfer tray, the describe system may reduce under filling or over filling the pocket. For example, under filling the pockets may result in the attachments debonding from the teeth. Over filling the pockets may result in excess adhesive on the tooth surface (i.e., flash), which may require removal by grinding.

After loading the pockets with adhesive, the transfer tray is placed on the patient's teeth and the adhesive is bonded to the teeth. By including preselected recesses within the transfer tray to receive the attachments, the described system may improve the accuracy with which the attachments are bonded to selected locations on the teeth. In this way, the describe system may reduce the need to remove a mispositioned attachment by grinding adhesive and attachment off the tooth. Additionally, or alternatively, the improved accuracy of the attachment placement may improve the forces and the moments and/or the predictability of the forces and the moments that a CTA is capable of applying to teeth. By improving the forces and/or the moments applied to the teeth, the system described herein may reduce treatment durations and/or improve the accuracy of the final position of the teeth of the patient at the end of the treatment.

Additionally, or alternatively, improved control of attachment shape, e.g., by forming using additive manufacturing, injection molding, ceramic injection molding; and attachment placement, e.g., using a transfer tray having prepositioned attachment receiving recesses, may enable forming attachments that improve patient comfort, improve patient compliance, and/or are more aesthetic. For example, the attachments may be shaped and positioned to reduce intrusion of the tongue and/or the inside of the cheeks, particularly when a CTA is not in the mouth covering the attachments. The attachments also may be shaped and positioned to facilitate removal of the CTA from the teeth by enabling specific directional disengagement of the CTA with the attachments, e.g., which do not compromise the effectiveness of the treatment or retention of the CTA on the teeth. The attachments also may be shaped and positioned to, along with corresponding shells or aperture in the CTA, reduce visibility of the attachments when the CTA is worn by the patient.

FIG. 1 is a conceptual diagram illustrating an example additive manufactured orthodontic article 100 including an attachment body 102 and a coupling portion 104. Attachment body 102 ("body 102") is configured to be bonded to the teeth to improve force application by a CTA to achieve desired tooth movements. Body 102 may have any suitable shape, such as a custom-formed shape that is unique to a particular application, patient, tooth, and/or region of a tooth. Body 102 may be sized such that body 102 is difficult to manipulate, e.g., using a tool such as tweezers. For example, body 102 may have a maximum dimension of 30 millimeters (mm) or less, 28 mm or less, 26 mm or less, 24 mm or less, 22 mm or less, 20 mm or less, 18 mm or less, 16 mm or less, 14 mm or less, 12 mm or less, 10 mm or less, 8 mm or less, 6 mm or less, 4 mm or less, 3 mm or less, or 2 mm or less; and 0.25 mm or greater, 0.50 mm or greater, 0.75 mm or greater, 1.00 mm or greater, 1.25 mm or greater, 1.50 mm or greater, 1.75 mm or greater, 2.00 mm or greater, 2.50 mm or greater, 3.00 mm or greater, or 3.50 mm or greater.

A bonding surface 106 of body 102 may be shaped to correspond to a contour of a portion of a tooth of a patient. Corresponding to the contour of the tooth may improve strength of an adhesive bond between body 102 and the tooth, reduce an amount of adhesive required for the bond, or both. In some examples, bonding surface 106 may include etched and/or embossed patterns intended to facilitate more secure bonding. In some examples, a perimeter edge of bonding surface 108 may be smooth, e.g., not etched or embossed, to facilitate removal from a tooth surface at the end of treatment.

A buccal, labial, or lingual facing surface 108 may include any suitable shape that is configured to transfer a force from a CTA to the tooth, retain the CTA on the tooth, or both. For example, one or more portions of surface 108 may be hemispherical, rectilinear, curvilinear, or irregular in shape. In some examples, surface 108 may include one or more surface features, including, but not limited to, one or more tapers, undercuts, overhangs, recesses, negative drafts, or other features configured to engage or otherwise interact with a CTA or a transfer tray. For example, surface 108 defines retaining member 110. Retaining member 110 includes a recess configured to engage at least a portion of a recess of a transfer tray, such as a corresponding protrusion within the recess.

Coupling portion 104 is configured to be engagable by a tool or a human hand for manipulation of body 102. For example, coupling portion 104 may facilitate insertion of body 102 into a recess of a transfer tray (discussed in reference to FIG. 2). In other examples, the coupling portion 104 can enhance hand placement of the body 102. In some examples, as illustrated in FIG. 1, coupling portion 104 is integrally formed with attachment body 102. For example, coupling portion 104 may include one or more frangible sections 112A and 112B (collectively, frangible sections 112) coupled to body 102 at respective connection points 114A and 114B (collectively, connections 114).

Frangible sections 112 concentrate stress at connection points 114 when bending, twisting, compression, or tension forces are applied, such as, for example, to coupling portion 104 by a handling tool. In some examples, frangible sections 112 may have a minimum dimension of 50 micrometers or larger, 75 micrometers or larger, or 100 micrometers or larger; and 1 mm or less. In some examples, a minimum dimension may be limited by the capabilities of a particular additive manufacturing method used to form article 100. In some examples, a size and a shape of frangible sections 112 may be selected to have a sufficient structural integrity to allow handling of article 100 while also breaking easily when desired. Stress is concentrated by virtue of frangible sections 112 having a minimum cross-sectional area at or near connection points 114 and there being an abrupt increase in area at a surface 107 of the body 102 at connection points 114. Frangible sections 112 may be broken by using a tool to bend or twist coupling portion 104 or to shear by pushing or pulling coupling portion 104.

Although illustrated as including two frangible section 112, in some examples, article 100 may include one frangible section or more than two frangible sections. In some examples, it may be advantageous to use more than one connection point for a larger attachment body and/or to increase the robustness of the article during fabrication and handling, thereby preventing premature breakage of the frangible sections, thus more than one connection point may be incorporated into any of the articles described above if desired.

In some examples, after breaking frangible sections 112, a vestige or a nub may be left on the body 102 at connection points 114. In some examples, the vestige or nub may be removed using any variety of high speed cutting and/or polishing tools. In other examples, the vestige or nub may remain if it does not interfere with appliance engagement. In other examples, as illustrated in FIG. 1, surface 107 of body 102 is recessed relative to bonding surface 106. The depth of recess may be greater than a vestige or a nub left after breaking frangible sections 112. In this way, the recess of surface 107 may prevent the vestige or nub from interfering with bonding surface 106, e.g., protruding past a plane defined by bonding surface 106.

Although illustrated in FIG. 1 as extending from attachment body 102, in other examples, attachment body 102 may define coupling portion 104. For example, coupling portion 104 may include one or more handling recesses configured to receive at least a portion of a handling tool.

Article 100 may be formed of a ceramic material, a polymeric material, a polymer composite, or a combination thereof. Suitable materials for use in additive manufacturing of orthodontic attachments may include, but are not limited to, materials described in International PCT Publications WO 2019/048963 (Parkar et al.), WO 2018/231583 (Herrmann et al.), WO 2016/191534 (Mayr et a.), WO 2016/191162 (Mayr et a.), and WO 2014/078537 (Sun et al.). Suitable components of a photopolymerizable slurry or sol (e.g., ceramic particles, solvent, radiation curable monomer, photoinitiator, and inhibitor) are describe in detail in co-owned Provisional Application No. 62/954,283, which is incorporated herein by reference in its entirety. Moreover, body 102 and coupling portion 104 can be formed of the same material or can be formed of different materials. For example, a photopolymerizable material used to form article 100 optionally includes a first composition and a second composition and making article 100 includes selectively curing the first composition to form body 102 and selectively curing the second composition to form coupling portion 104. In some examples, body 102 may be formed of a material that has a higher ultimate strength than a material of which frangible sections 112 are formed.

Figure 2:
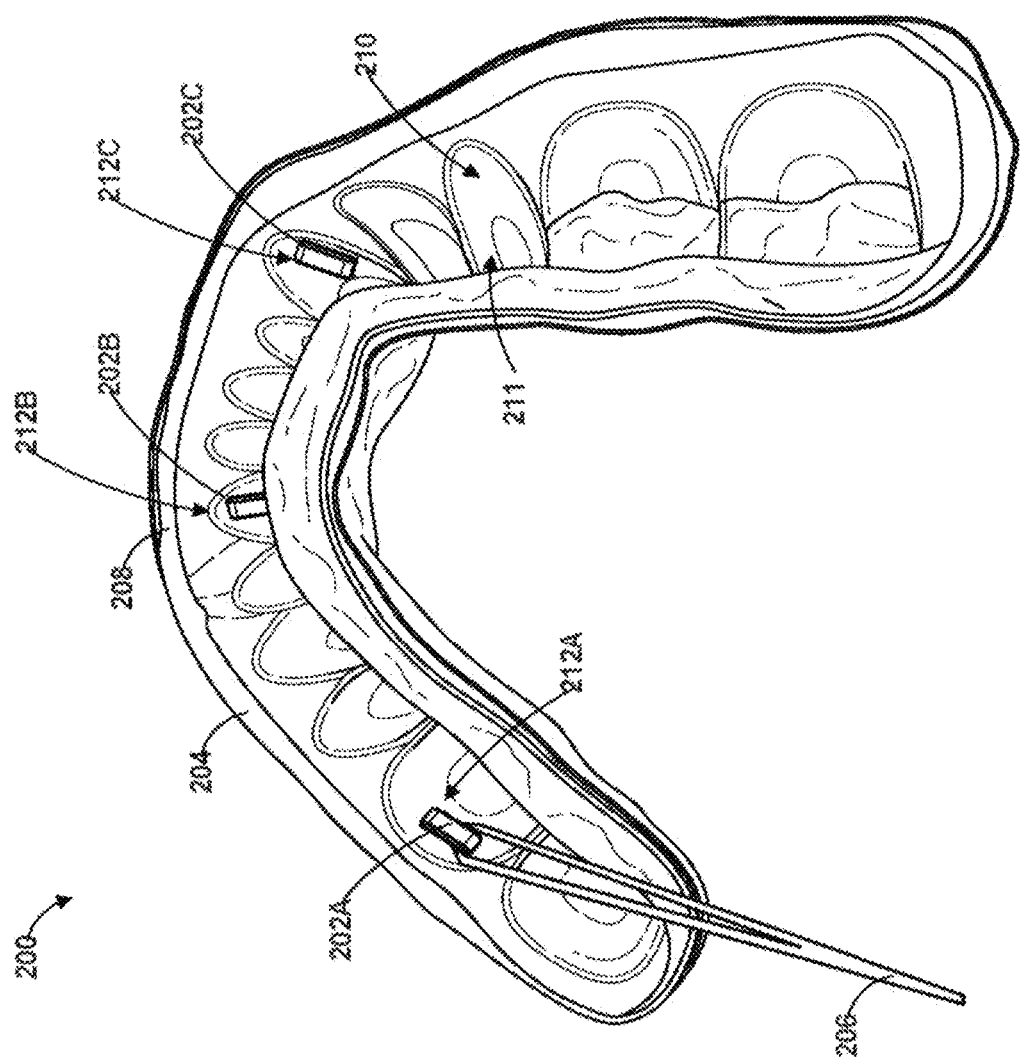
FIG. 2 is a conceptual diagram illustrating an example orthodontic system including a plurality of attachments, a transfer tray to receive the plurality of attachments, and a handling tool for positioning the plurality of attachments in the transfer tray.

FIG. 2 is a conceptual diagram illustrating an example orthodontic system 200 including a plurality of attachments 202A, 202B, and 202C (collectively, attachments 202), a transfer tray 204 configured to receive attachments 202, and a handling tool 206 (tool 206) for positioning attachments 202 in transfer tray 204. In some examples, orthodontic system 200 defines a kit. Attachments 202 may be the same as or substantially similar to article 100 and/or attachment body 102 of article 100 discussed above in reference to FIG. 1.

Tool 206 is configured to engage with a coupling portion (e.g., coupling portion 104) of a respective attachment 202. The mechanism for engaging, by tool 206, attachments 202 may include, but is not limited to, a clamp connection, a slit and beam connection, a screw and thread connection, a snap connection, a bolt connection, a friction fit connection, a pressure sensitive adhesive connection, other mechanical coupling suitable for an article having a size and shape of attachments 202, or a vacuum or suction coupling. As illustrated in FIG. 2, tool 206 includes a tweezers configured to engage attachments 202 via a clamp connection.

Transfer tray 204 is configured to receive attachments 202. Transfer tray 204 includes a body 208 defining a plurality of shells 210 (shells 210). Each respective shell of shells 210 is configured to receive an outer surface of a respective tooth. In this way, transfer tray is configured to align with the dentition of a patient. Each shell of shells 210 that is configured to receive a respective attachment of attachments 202, defines a respective recess 212A, 212B, 212C (collectively, shell recesses 212) within shells 210 that is shaped to receive the respective attachment of attachments 202. For example, an interior surface 211 of shells 210 may define recesses 212. In some examples, shell recesses 212 may include a feature, such as an undercut or a protrusion, that is configured to engage with a corresponding feature on an attachment 202. For example, as discussed above in reference to FIG. 1, attachment body 102 may define undercut 110 and a surface of shell recesses 212 may define a protrusion configured to engage undercut 110. In this way, corresponding features on a respective attachment and shell recess may improve a security of attachments 202 while at least one of placing a plurality of attachments 202 into transfer tray 204, applying adhesive to bonding surface 106 of attachments 202, or manipulating transfer tray 204 to position transfer tray 204 in the mouth of patient.

Additive manufacturing allows for extensive design freedom in configuring attachments 202 and/or transfer tray 204. For example, in reference to FIG. 1, article 100 may be formed by additive manufacturing to incorporate an angle between coupling portion 104 and body 102 to provide convenient orientation of body 102 with respect to a tool 206 for manipulating body 102, such as for placement into transfer tray 204. Additionally, or alternatively, article 100 may extend from a base as an angle to provide convenient orientation of article 100 with respect to tool 206 for manipulating body 102, such as for retrieving article 100 from a base from which a plurality of articles extend.

After positioning each respective attachment of attachments 202 in a respective shell recess of shell recesses 212, adhesive may be applied to bonding surface 106 of attachments 202. In some examples, dental adhesive used to bond attachments 202 to teeth 302 may include a light-cure adhesive, a chemical cure adhesive, a dual cure adhesive, 3M RELYX Ultimate Adhesive Resin Cement, SCOTCHBOND Universal Adhesive, TRANSBOND XT Primer, TRANSBOND MIP Primer, or APC FLASH-FREE adhesive, all available from 3M Company (St. Paul, Minnesota), or the like. The adhesive may be selected for compatibility with the material used to fabricate the attachment body 102 to securely bond attachments 202 onto teeth 302. In some examples, shell recesses 212 may be shaped to position bonding surface 106 of attachments 202 relative to interior surface 211 of shells 210 to form a pocket. The pocket may include a selected depth, e.g., relative to interior surface 211, to retain a selected amount of adhesive for bonding attachments 202 to the teeth of the patient. In this way, the amount of adhesive may be controlled to reduce excessive adhesive use, which may result in flashing that must be removed, and/or to reduce insufficient adhesive use, which may compromise bonding strength. After application of adhesive to attachments 202, transfer tray 204 may be positioned on the teeth of a patient.

FIG. 3 is a conceptual diagram illustrating attachments 202 on a dentition 300 of a patient. For example, a clinician may first position transfer tray 204 on dentition 300. Then, in examples in which the dental adhesive includes a light cure adhesive, the clinician may direct a selected wavelength of radiation, e.g., actinic radiation, toward one or more of attachments 202 to cause a light-activating resin to set, thereby bonding attachments 202 to teeth 302. In other examples, the clinician may use an activator or other means to initiate curing of the adhesive immediately before positioning transfer tray 204 of teeth 302 or while transfer tray 204 is positioned on teeth 302.

Figure 4A:
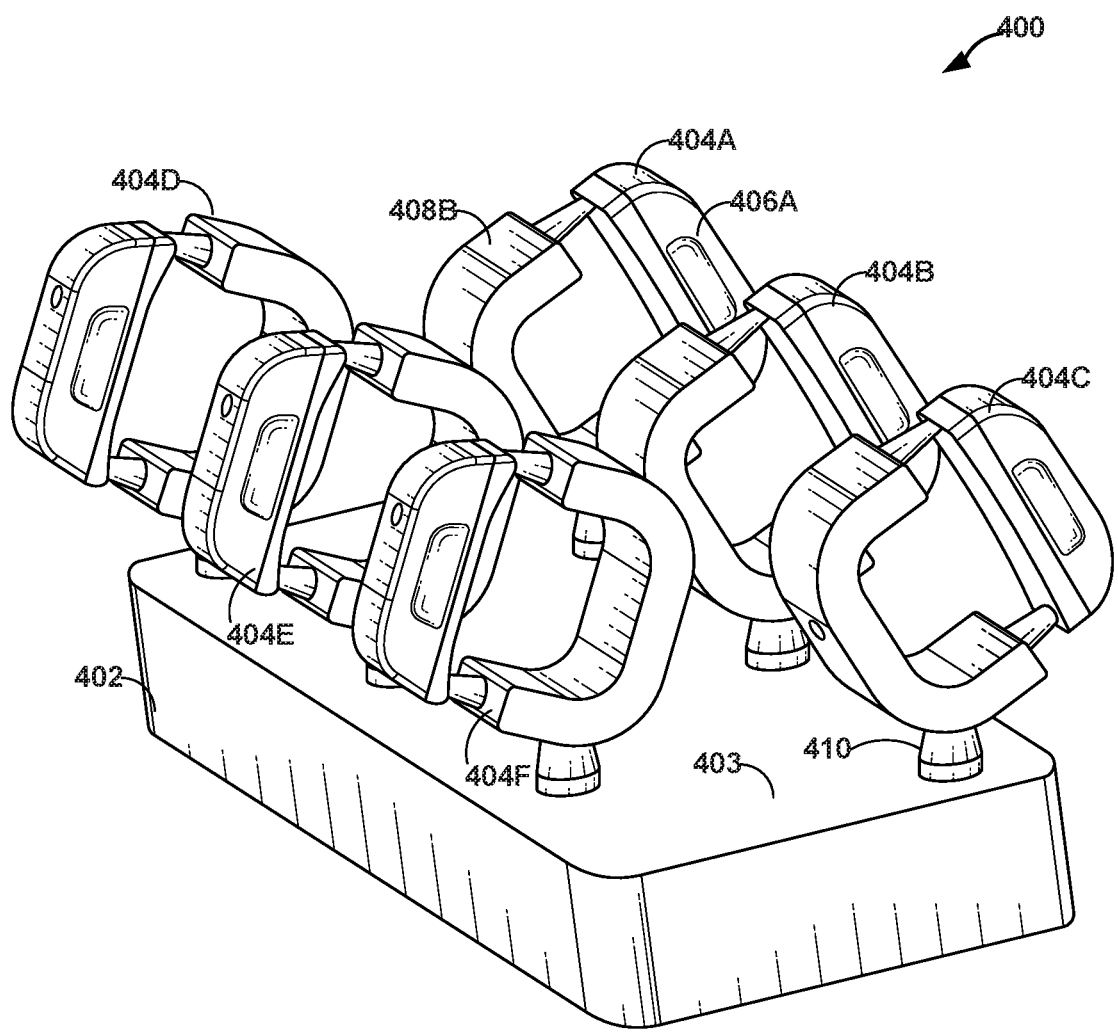
FIG. 4A is a conceptual diagram illustrating an example assembly including a build platform from which a plurality of articles extend.
Figure 4B:
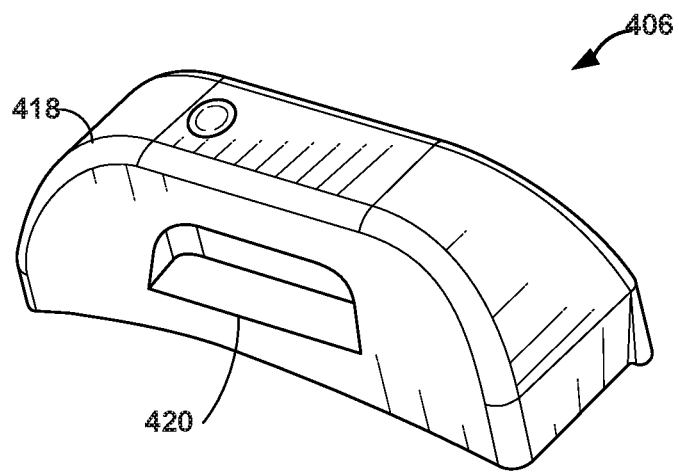
FIG. 4B is a diagram illustrating an example attachment body.
Figure 4C:
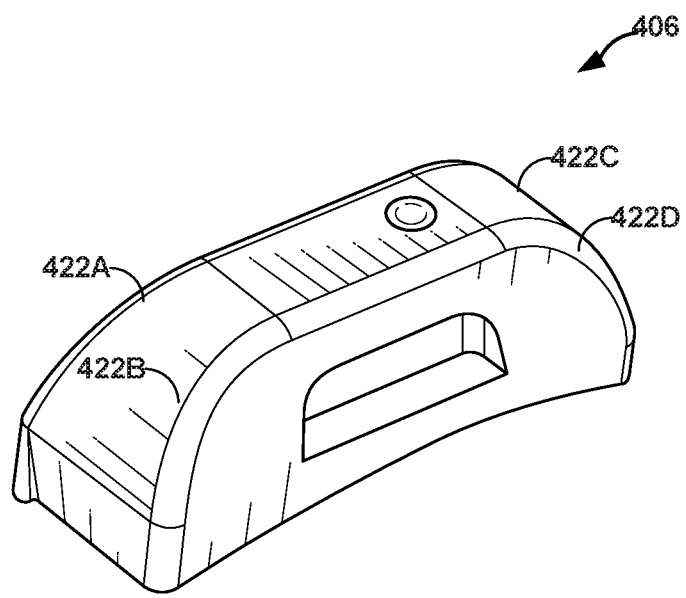
FIG. 4C is a diagram illustrating of an example attachment body.

FIG. 4A-4C are conceptual diagrams illustrating an example assembly 400 including a build platform 402 from which a plurality of articles 404A-404F (collectively, articles 404) extend. Articles 404 are the same as or substantially similar to article 100 discussed above in reference to FIG. 1, except for the differences described herein. For example, article 404A includes body 406A (e.g., body 102) and coupling portion 408A (e.g., coupling portion 104).

Build platform 402 may include any suitable shape. For example, build platform 402 may include a substantially planar plate, one or more elongate runners, or the like. Build platform 402 also includes sprues 410 which support articles 404. As illustrated in FIG. 4A, sprues 410 extend from build platform 402 to coupling portion 408. In other examples, sprues 410 may extend from build platform 402 to body 406. Sprues 410 are configured to break in response to a bending, twisting, compression, or tension. For example, tool 206 may be used to break sprues 410 by applying a pull force to articles 404. In some examples, sprues 410 may extend from build platform 402 at a selected angle. The angle may be selected to provide a convenient orientation of articles 404 with respect to a tool 206 for manipulating body 406, such as for retrieving article 404 from a build platform 402.

In examples in which articles 404 includes bodies 406 uniquely shaped for a selected tooth, build platform 402 may include indicia identifying one or more article of articles 404. The indicia may include text, symbols, coloring, or the like. For example, build platform 402 may be formed by the additive manufacturing techniques described herein to include text embossed on a surface 403 of build platform 402, the text indicating a tooth number for each respective article of articles 404.

FIGS. 4B and 4C are perspective views of body 406. As discussed above in reference to body 102 illustrated in FIG. 1, body 406 defines a surface 418 (e.g., surface 108). Additionally, body 406 defines an undercut 420 (e.g., undercut 110) that is configured to retain body 406 within a recess of a transfer tray. Surface 418 may be shaped to provide functionality by engaging or otherwise interacting with a CTA to transfer a force from the CTA to a respective tooth (as discussed above in reference to FIG. 1), improve comfort to the patient whether or not the CTA is being worn, and/or improve aesthetics of an orthodontic system including the attachment and the CTA. With respect to comfort and aesthetics, surface 418 is shaped to include multiple tapered edges 422A, 422B, 422C, and 422D (collectively, tapered edges 422) without sharp edges. Tapered edges 422 may reduce interference with the tongue, cheeks, and/or lips to improve comfort for the patient. Additionally, or alternatively, the soft, tapered edges may reduce light refraction to reduce visibility of body 406 when bonded to the teeth.

Figure 5:
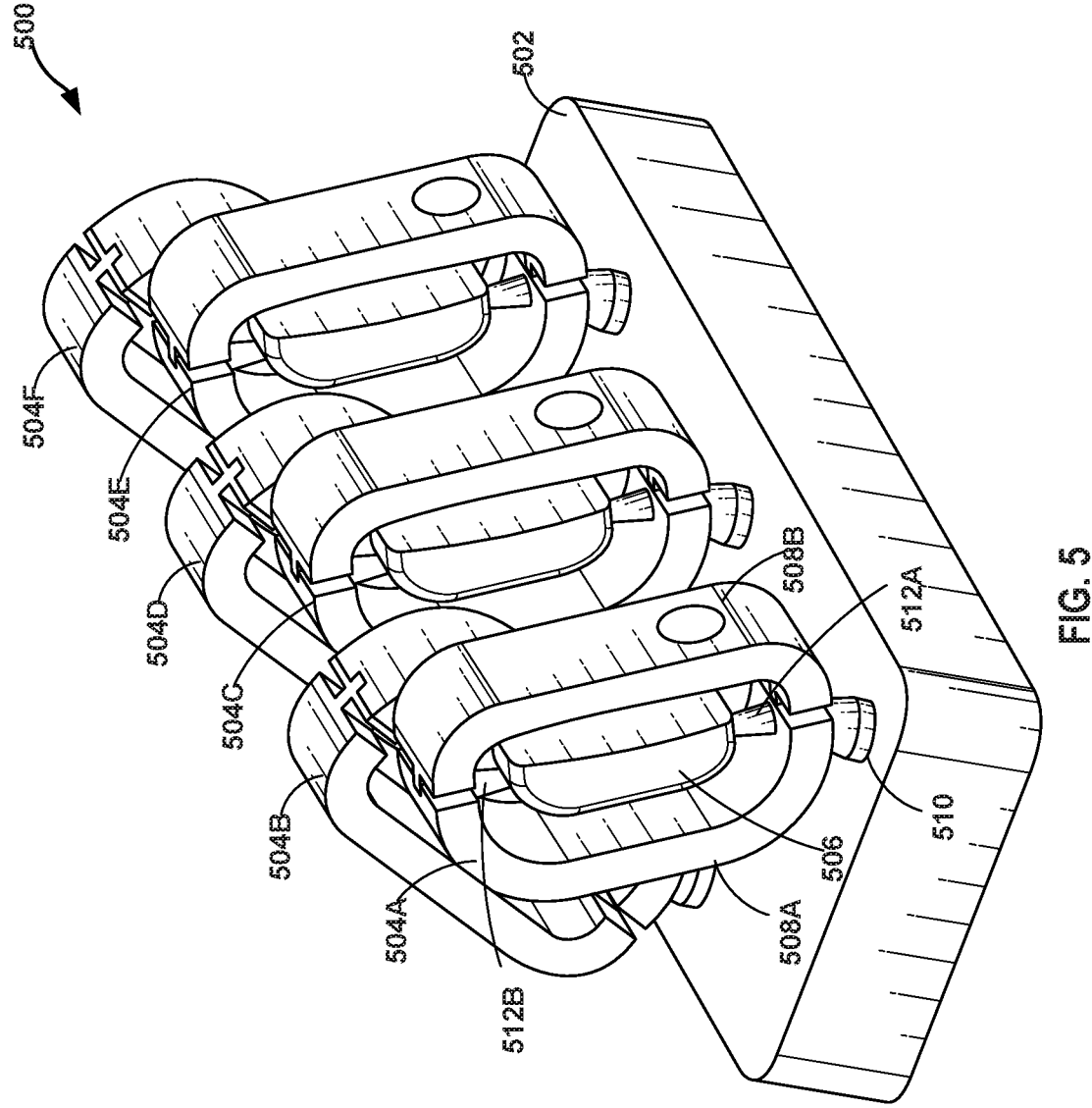
FIG. 5 is a conceptual diagram illustrating an example assembly including a build platform from which a plurality of articles extend.

FIG. 5 is a conceptual diagram illustrating an example assembly 500 including build platform 502 from which a plurality of articles 504A-504F extend. Assembly 500 may be the same as or substantially similar to assembly 400 discussed above in reference to FIG. 4A, except for the differences described herein. For example, articles 504 include body 506 and coupling portion 508 that includes a first coupling portion 508A and a second coupling portion 508B. First coupling portions 508A of each article of articles 504 are coupled to build platform 502 via respective sprues 510. Body 506 is coupled to first coupling portion 508A via frangible sections 512A and 512B. First coupling portion 508A is coupled to second coupling portion 508B via frangible sections 509A and 509B. Frangible section 509A, 509B, 512A, and 512B may be the same as or substantially similar to frangible sections 112A and 112B discussed above in reference to FIG. 1. In some examples, second coupling portion 508B enable manipulation of articles 504 to interest first coupling portion 508A and body 506 into a recess of a transfer tray. Once positioned in the recess, second coupling portion 508B may be removed by breaking frangible sections 509A and 509B. Then, after bonding body 506 to a tooth, first coupling portion 508A may be removed by breaking frangible sections 512A and 512B. For example, after bonding body 506 to a tooth, removing the transfer tray from the mouth of the patient may cause first coupling portion, which is engaged with a recess of the transfer tray, to remain engaged, thereby breaking frangible sections 512A and 512B.

Figure 6:
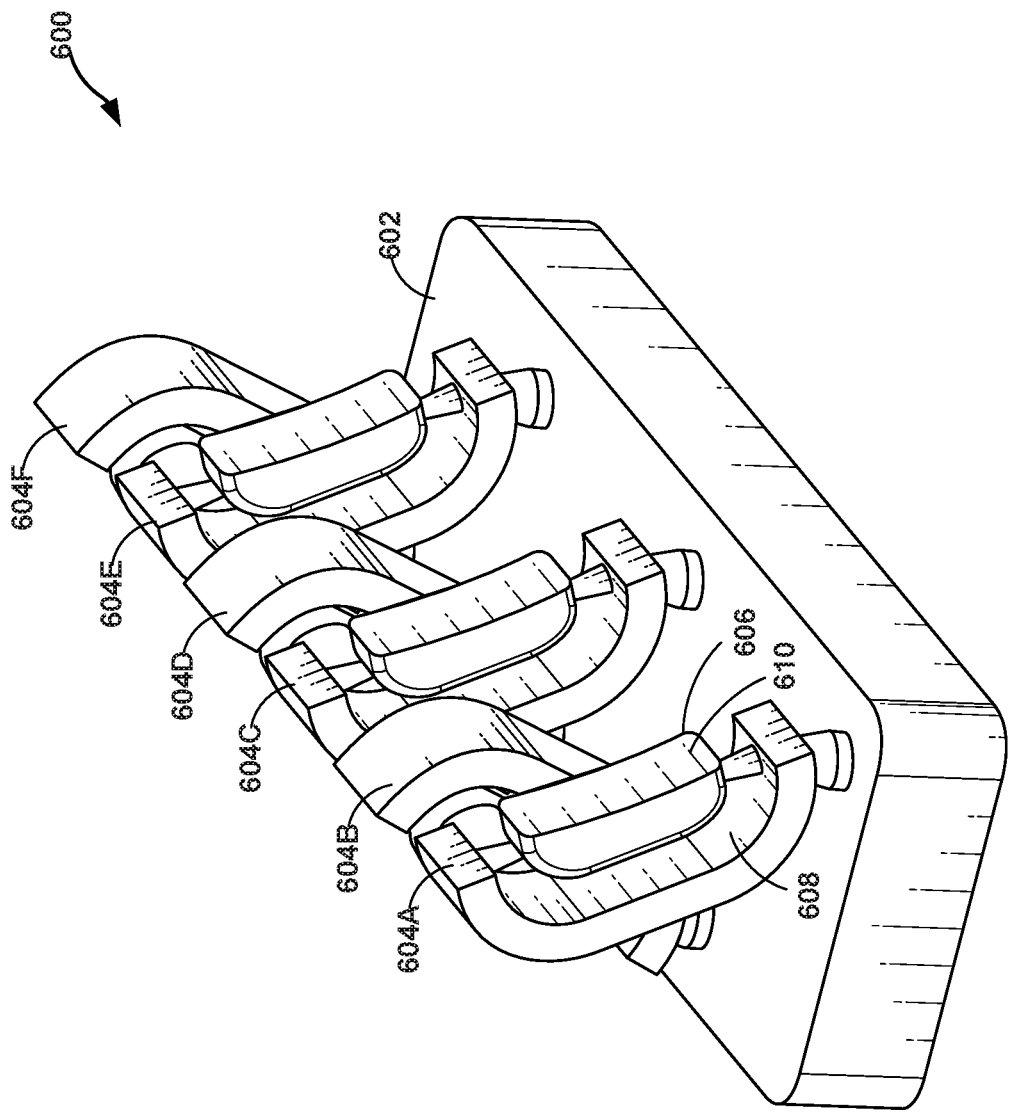
FIG. 6 is a conceptual diagram illustrating an example assembly including a build platform from which a plurality of articles extend.

FIG. 6 is a conceptual diagram illustrating an example assembly 600 including build platform 602 from which a plurality of articles 604A-604F extend. Assembly 600 may be the same as or substantially similar to assembly 400 and/or 500 discussed above in reference to FIGS. 4A and 5, except for the differences described herein. For example, articles 604 include body 606 and only a first coupling portion 608. As discussed above, in some examples, coupling portion 608 may be inserted into and engage a recess of a transfer tray to facilitate bonding of body 606 to a tooth.

Figure 7:
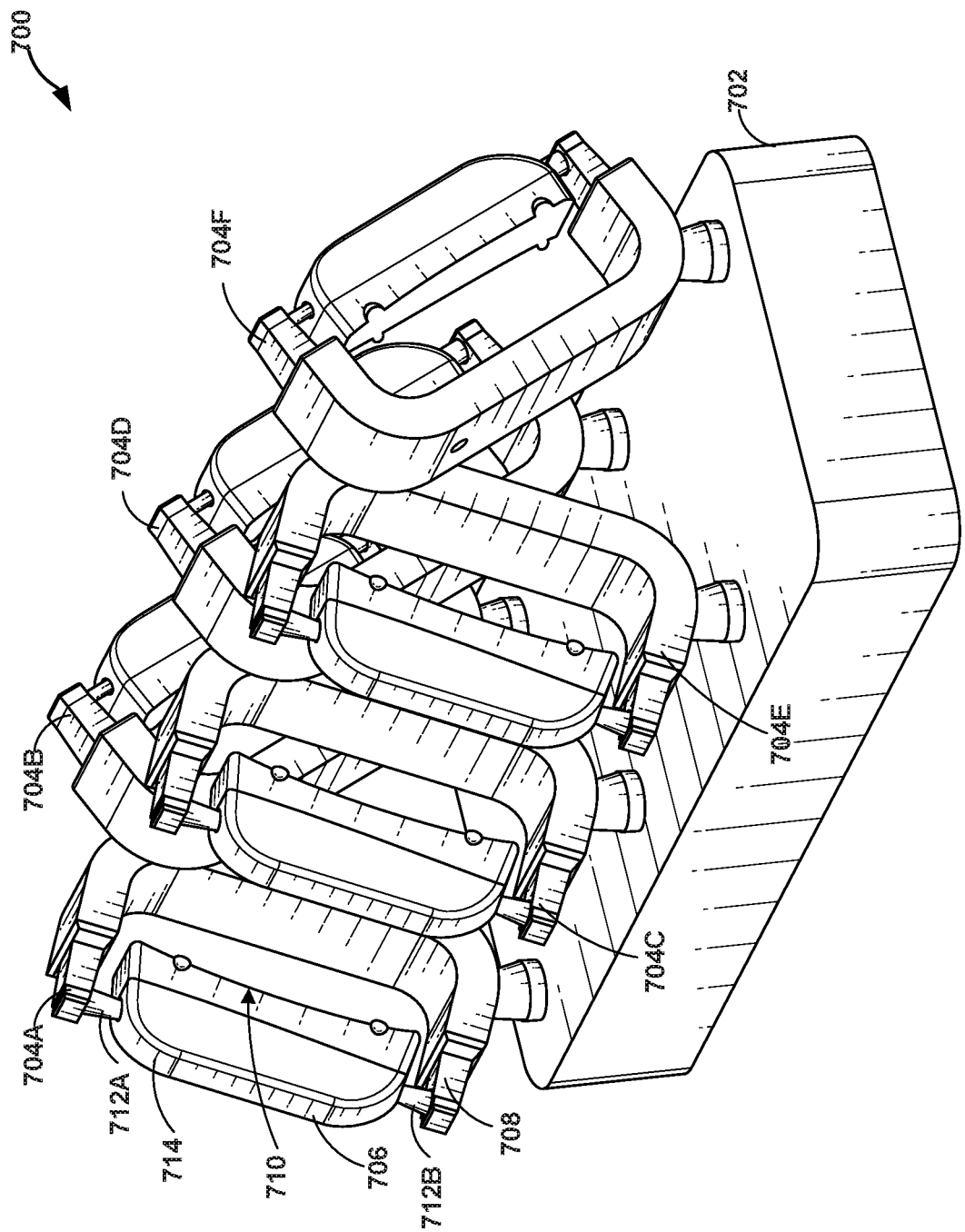
FIG. 7 is a conceptual diagram illustrating an example assembly including a build platform from which a plurality of articles extend.

FIG. 7 is a conceptual diagram illustrating an example assembly 700 including build platform 702 from which a plurality of articles 704A-704F extend. Assembly 700 may be the same as or substantially similar to assembly 400, 500, and/or 600 discussed above in reference to FIGS. 4A-6, except for the differences described herein. For example, articles 704 include body 706 having bonding surface 710 oriented in a direction facing coupling portion 708. Frangible sections 712A and 712B extend from surface 714 rather than bonding surface 710 to avoid vestige of frangible section 712A and 712B on bonding surface 710 after coupling portion 708 is removed from body 706.

Figure 8:
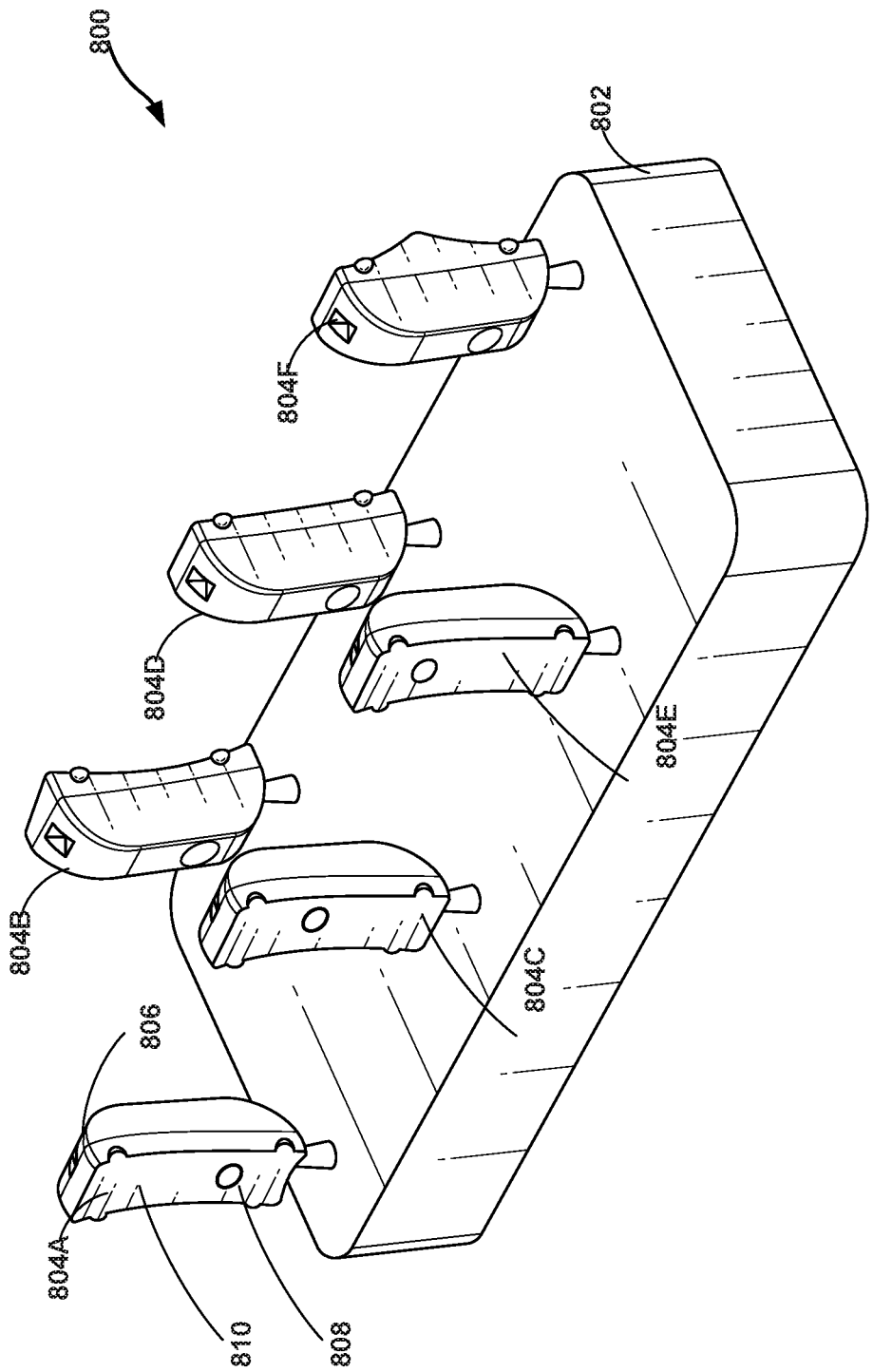
FIG. 8 is a conceptual diagram illustrating an example assembly including a build platform from which a plurality of articles extend.

FIG. 8 is a conceptual diagram illustrating an example assembly 800 including build platform 802 from which a plurality of articles 804A-804F extend. Assembly 800 may be the same as or substantially similar to assembly 400, 500, 600, and/or 700 discussed above in reference to FIGS. 4A-7, except for the differences described herein. For example, articles 804 include body 806 having bonding surface 810. Articles 804 do not include an integrally formed coupling portion. Rather, body 802 may define coupling portions 808 that include a recess configured to receive at least a portion of a tool or interact with a protrusion on the transfer tray.

FIGS. 9A, 9B, and 9C are conceptual diagrams illustrating an example additive manufactured orthodontic article 900. Article 900 may be the same as or substantially similar to articles 604 discussed above in reference to FIG. 6. For example, article 900 include body 902 and coupling portion 904 connected to body 902 via first frangible section 912A and second frangible section 912B. As illustrated in FIG. 9B, body 902 may define a beveled buccal/labial/lingual facing surface 908. In some examples, a beveled surface 908 may improve release of body 902 from a transfer tray after bonding to a tooth and/or improve transfer of force from a CTA to the tooth by concentrating contact of the CAT with body 902 at apex 909 of the bevel or provide a lead-in for engagement with there is a mismatch in position between a CTA and tooth.

The coupling portion 904 may form a continuous perimeter surrounding the body 902 (FIG. 9C) or may form a partial perimeter (FIG. 9A). The body 902 may be arranged such that the apex 909 faces the coupling portion and the bonding surface 910 is substantially perpendicular to a plane defined by the coupling portion 904 (FIG. 9A) or such that the bonding surface 910 is in a plane substantially parallel to the outer surface 905 of the coupling portion 905 (FIG. 9C). Other arrangements are also possible depending on the geometry of the attachment pocket or at patient's malocclusion.

Figure 10A:
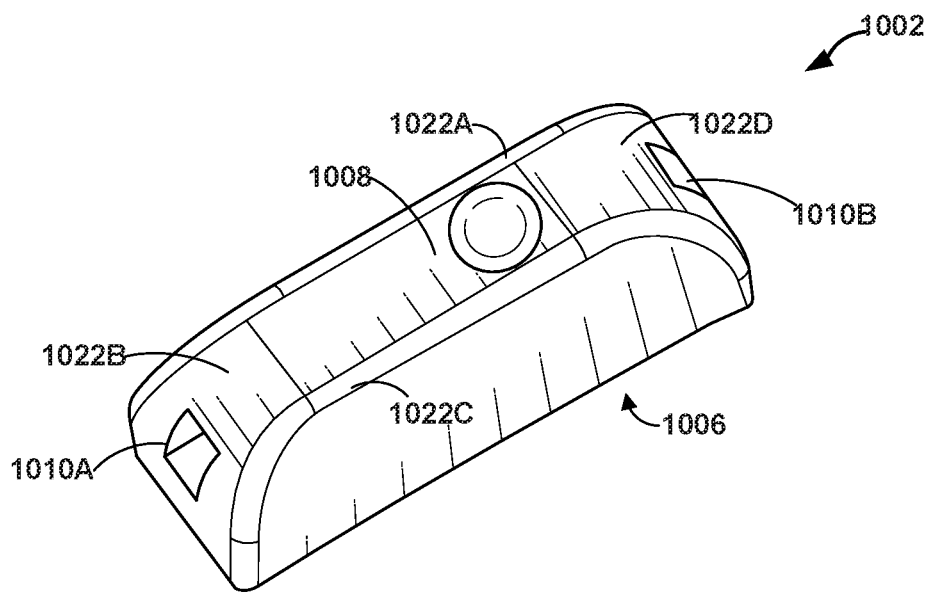
FIG. 10A is a diagram illustrating an example attachment body.
Figure 10B:
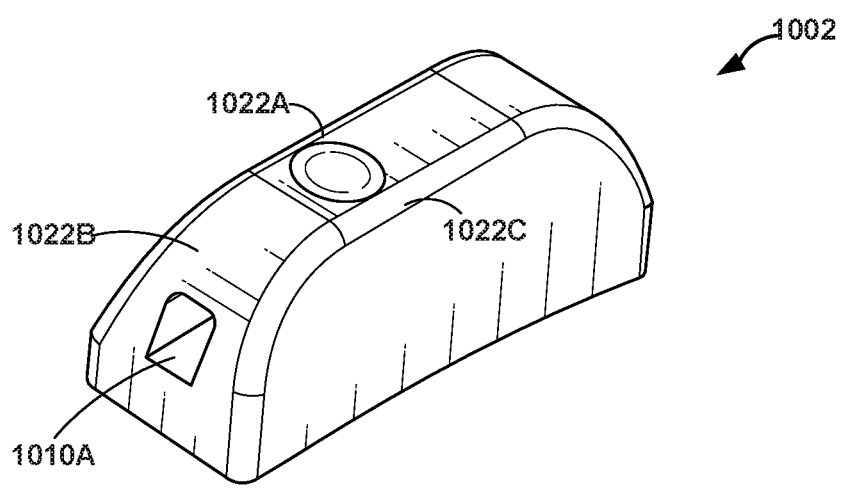
FIG. 10B is a diagram illustrating an example attachment body.

FIGS. 10A and 10B are diagrams illustrating an example attachment body 1002. Body 1002 may be the same as or substantially similar to body 102 described above in reference to FIG. 1, expect for the differences described herein. For example, body 1002 includes a bonding surface 1006 and a buccal, labial, or lingual facing surface 1008 defining retaining members 1010A and 1010B. Surface 1008 is shaped to include multiple tapered edges 1022A, 1022B, 1022C, and 1022D (collectively, tapered edges 1022) without sharp edges. As discussed above in reference to FIGS. 4B and 4C, tapered edges 1022 may reduce interference with the tongue, cheeks, and/or lips to improve comfort for the patient and/or reduce visibility of body 1002 when bonded to the teeth.

Figure 11A:
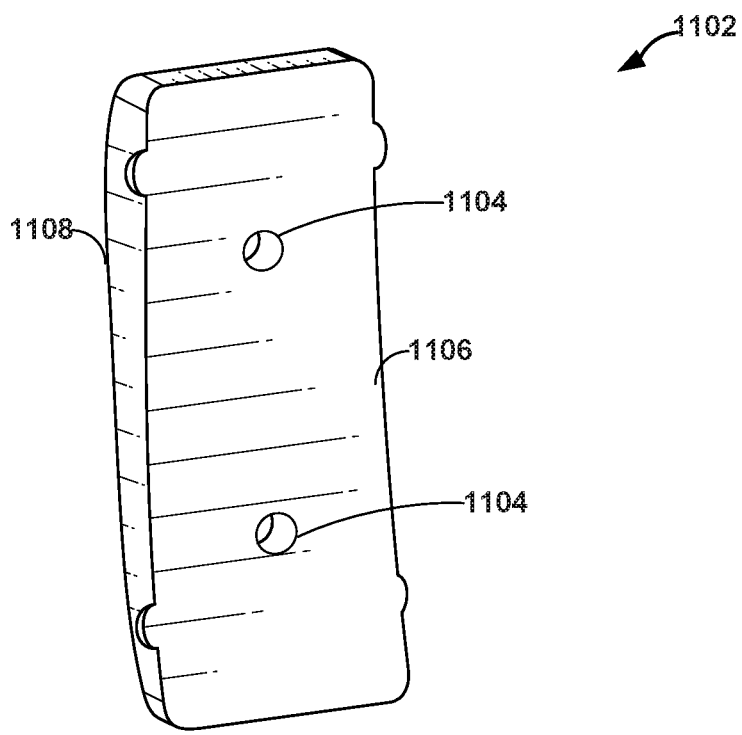
FIG. 11A is a diagram illustrating an example coupling portion defined by an attachment body.
Figure 11B:
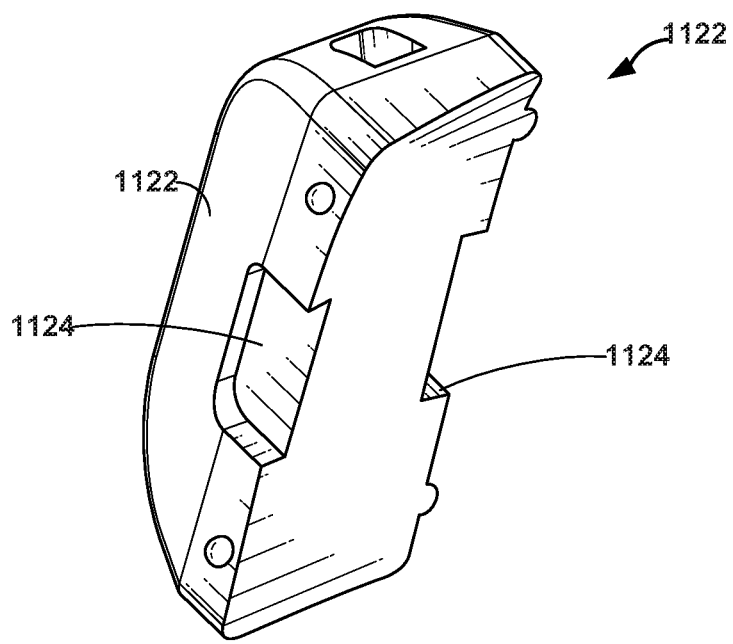
FIG. 11B is a diagram illustrating an example coupling portion defined by an attachment body.

FIGS. 11A and 11B are diagrams illustrating example coupling portions 1104 and 1124 defined by respective attachment bodes 1102 and 1122. Bodies 1102 and 1122 may be the same as or substantially similar to any of bodies 102, 202, 406, 506, 606, 706, 806, 902, or 1002 discussed above in reference to FIGS. 1 through 10B, except for the differences described herein. FIG. 11A illustrates example coupling portions 1104 that include two recesses defined by a bonding surface 1106 of attachment body 1102. In some examples, coupling portions 1104 are configured to receive at least a portion of a tool for manipulating body 1102. For example, coupling portions 1104 may be sized to receive arms of a retaining ring pliers or similar tool. In some examples, by defining coupling portions 1104 on bonding surface 1106, body 1102 may reduce recesses in buccal/labial/lingual facing surface 1108 that could retain food or bacteria and/or reduce edges on surface 1108 that may reduce patient comfort.

FIG. 11B illustrates example coupling portions 1124 at two recesses defined by buccal/labial/lingual facing surface 1128 of attachment body 1122. In some examples, coupling portions 1124 are configured to receive at least a portion of a tool for manipulating body 1102. For example, coupling portions 1124 may be sized to receive arms of a tweezers or similar tool such that the tool may be used to place body 1122 into a recess of a transfer tray without the arms of the tool interfering with the sidewalls of the recess.

Figure 12A:
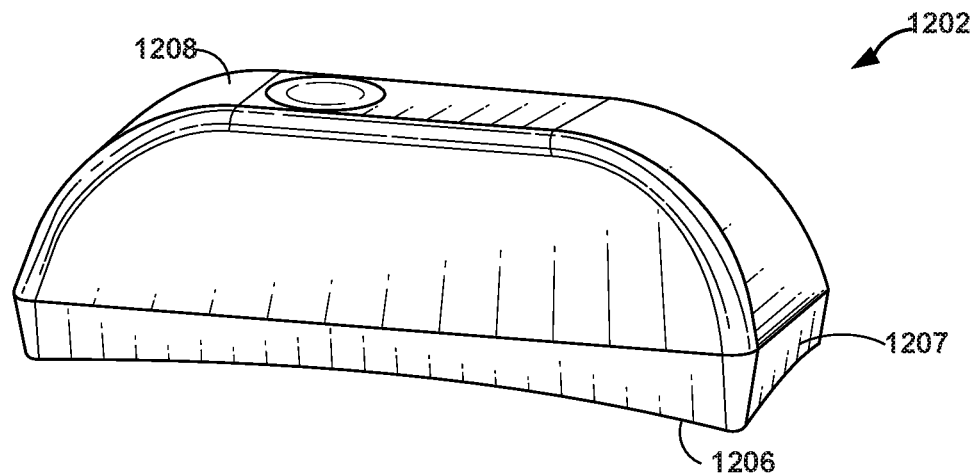
FIG. 12A is a diagram illustrating an example attachment body having a negative draft.
Figure 12B:
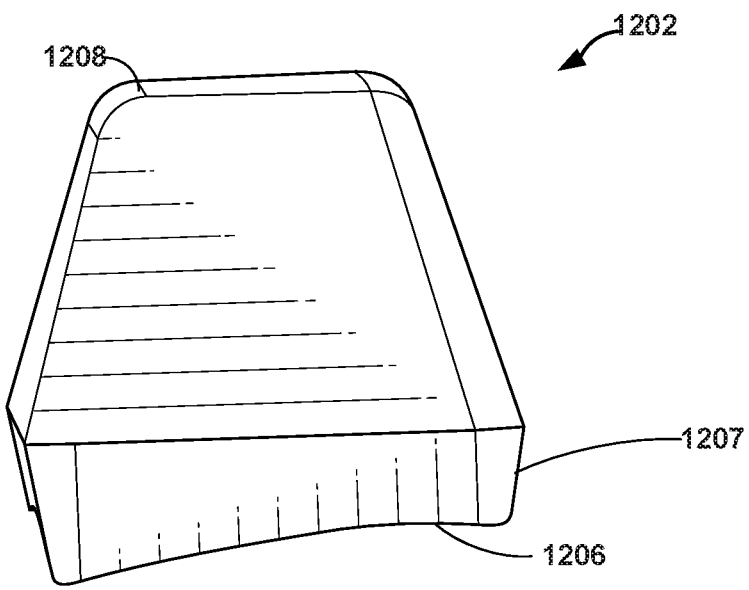
FIG. 12B is a diagram illustrating an example attachment body having a negative draft.

FIGS. 12A and 12B are diagrams illustrating an example attachment body 1202 having a negative draft 1207 on buccal/labial/lingual facing surface 1208 adjacent bonding surface 1206. In some examples, negative draft 1207 may define a retaining member configured to retain body 1202 within a recess of a transfer tray. For example, a recess of a transfer tray may include a flexible sidewall configured to deform to accommodate a perimeter body 1202 defined by surface 1208 (e.g., at apex or widest portion 1209). After deforming to accommodate widest portion 1209, the sidewall of the transfer tray may at least partially recover in shape to secure negative draft 1207 against the sidewall. Additionally, or alternatively, negative draft 1207 may be shaped to engage a portion of a CTA. For example, a CTA may include a recess similar to the recess of the transfer tray discussed above. In this way, negative draft 1207 may secure body 1202 within a recess of a transfer tray or a CTA.

Figure 13A:
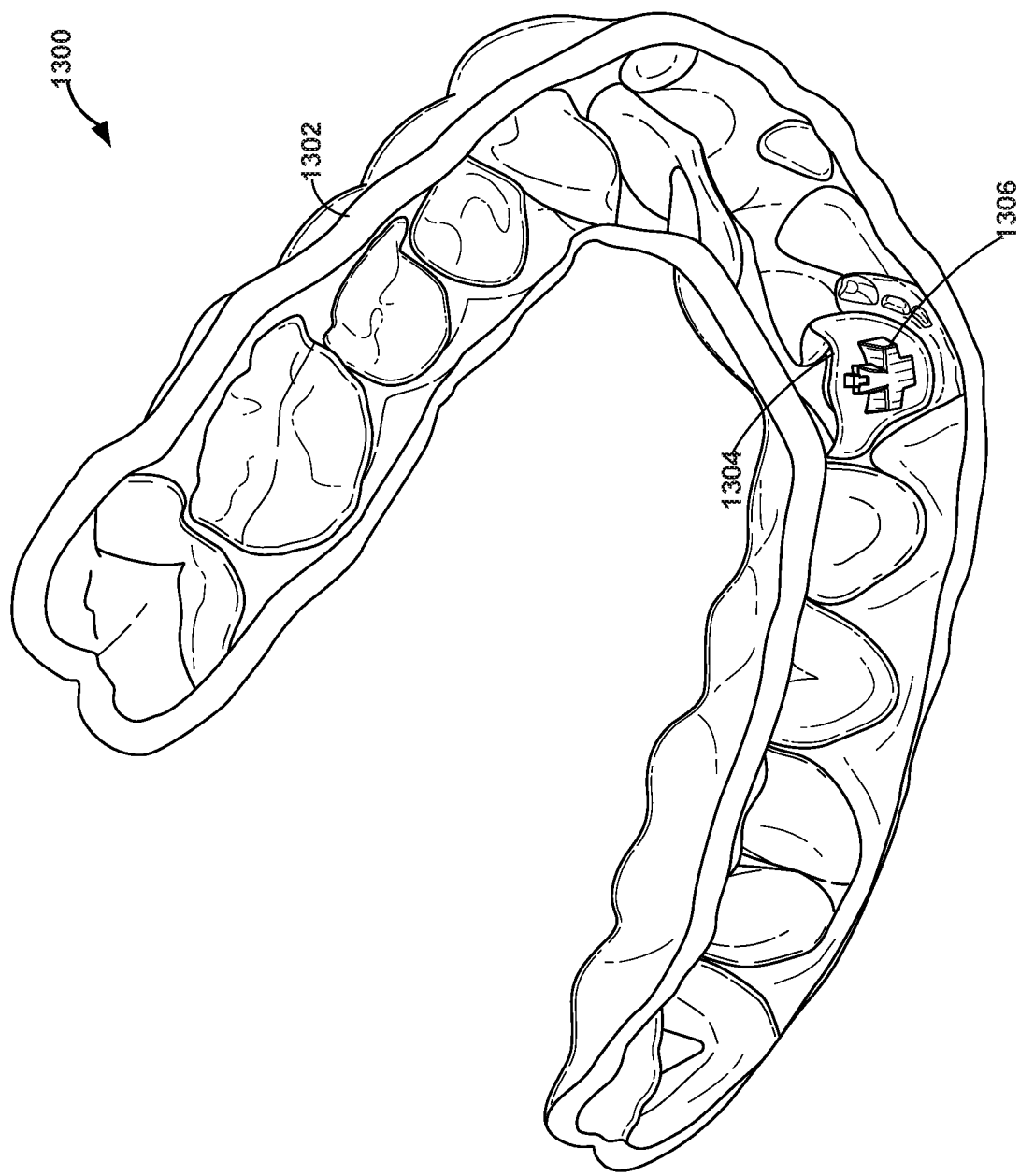
FIG. 13A is a conceptual diagram illustrating an example transfer tray.
Figure 13B:
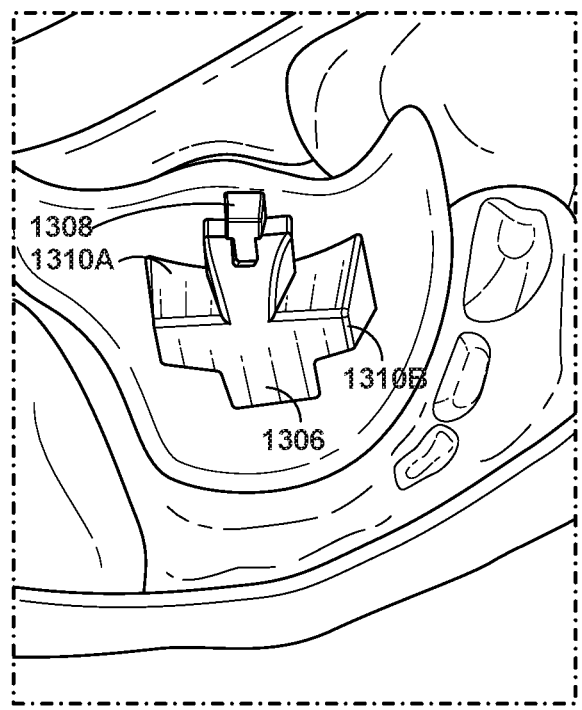
FIG. 13B is a conceptual diagram illustrating an example shell of a transfer tray.
Figure 13C:
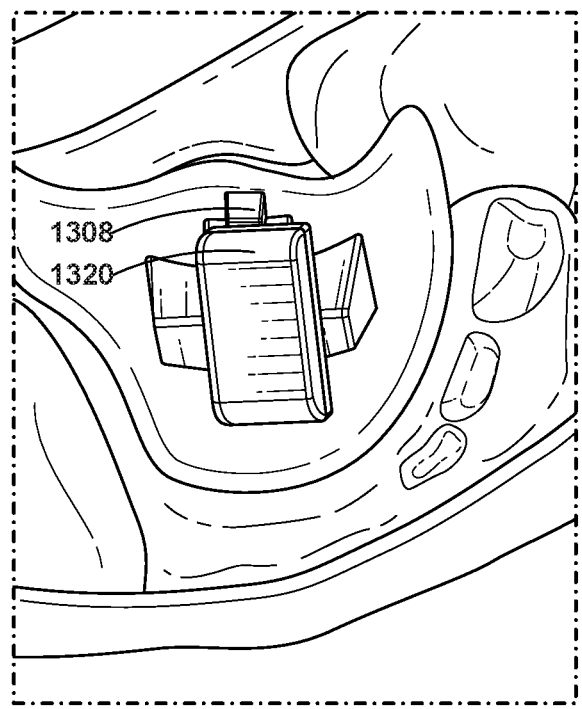
FIG. 13C is a conceptual diagram illustrating an example shell of a transfer tray.

FIG. 13A-13C are conceptual diagrams illustrating an example transfer tray 1300. Transfer tray 1300 may be the same as or substantially similar to transfer tray 240 described above in reference to FIG. 2, except for the differences described herein. Transfer tray 1300 includes a body 1302 defining a plurality of shells, e.g., shell 1304. The sidewall of shell 1304 defines recess 1306 and a tab 1308. Recess 1306 has a cross shape having arms 1310A and 1310B that are configured to receive arms of a tool, e.g., a tweezer, used to position an attachment body within recess 1306. As illustrated in FIG. 13C, when attachment body 1320 is positioned within recess 1306, tab 1308 is configured to engage a retaining member, e.g., a recess, defined by body 1320.

Figure 14:
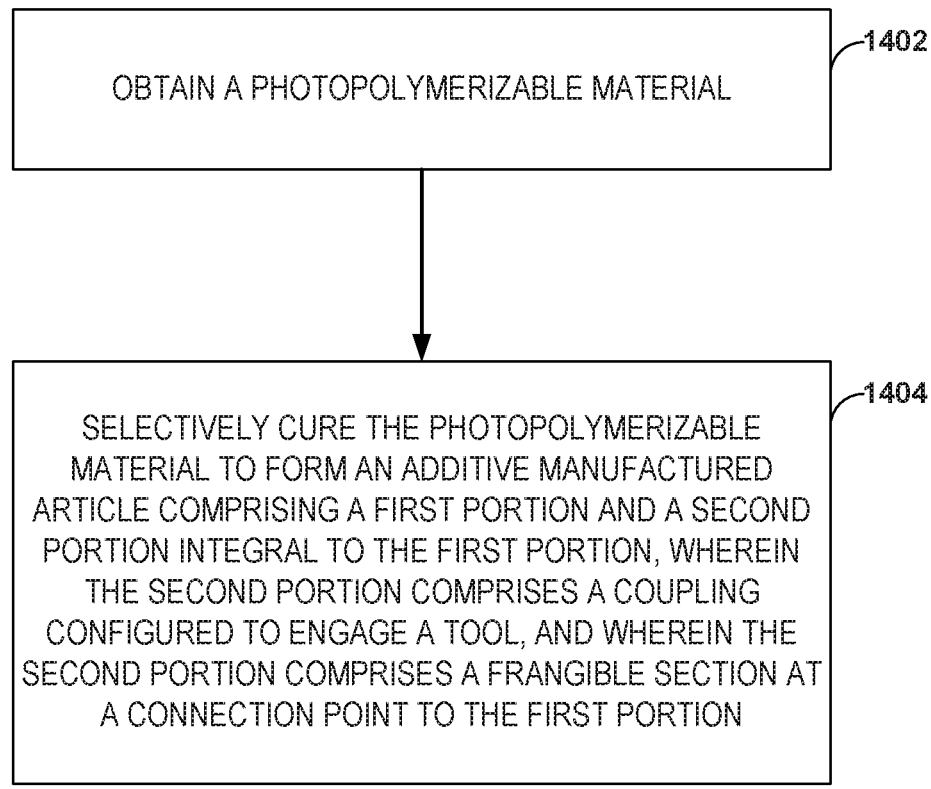
FIG. 14 is a flow chart of an example technique of making an additive manufactured article.

FIG. 14 is a flow chart illustrating an example technique of making an additive manufactured article including an orthodontic attachment. An example technique includes the steps of obtaining a photopolymerizable material (1402); selectively curing the photopolymerizable material to form an additive manufactured article including a body defining a retaining member configured to retain the attachment in a recess defined by a body of a transfer tray; a coupling portion configured to engage a tool for insertion of the attachment into the recess; and a bonding surface configured to bond the attachment to a portion of an outer surface of a tooth of a patient (1404).

In some examples, the technique may include a three-dimensional (3D) printing. Three-dimensional printing may include, for example, forming the article from a plurality of layers of a photopolymerizable material described herein by selectively curing the photopolymerizable material in a layer-by-layer manner. In some examples, additive manufactured article may include a plurality of materials bonded to each other. The layers of the photopolymerizable material can be deposited according to an image of the three-dimensional article in a computer readable format. For example, the photopolymerizable material may be deposited according to preselected computer aided design (CAD) parameters (e.g., a data file). In some examples, the photopolymerizable material is cured using actinic radiation, such as UV radiation, e-beam radiation, visible radiation, or combinations thereof.

Additionally, it is to be understood that methods of manufacturing a 3D article described herein can include stereolithography or vat polymerization. For example, the technique may include retaining a photopolymerizable composition described herein in a fluid state in a container and selectively applying energy to the photopolymerizable composition in the container to solidify at least a portion of a fluid layer of the photopolymerizable composition, thereby forming a hardened layer that defines a cross-section of the 3D article. The technique also may include raising or lowering the hardened layer of photopolymerizable composition to provide a new or second fluid layer of unhardened photopolymerizable composition at the surface of the fluid in the container, followed by again selectively applying energy to the photopolymerizable composition in the container to solidify at least a portion of the new or second fluid layer of the photopolymerizable composition to form a second solidified layer that defines a second cross-section of the 3D article. Further, the first and second cross-sections of the 3D article can be bonded or adhered to one another in the z-direction (or build direction corresponding to the direction of raising or lowering recited above) by the application of the energy for solidifying the photopolymerizable composition. Moreover, selectively applying energy to the photopolymerizable composition in the container can include applying actinic radiation, such as UV radiation, visible radiation, or e-beam radiation, having a sufficient energy to cure the photopolymerizable composition. The technique also may include planarizing a new layer of fluid photopolymerizable composition provided by raising or lowering an elevator platform. Planarization can be carried out, for example, by utilizing a wiper or roller or a recoater. Planarization may correct the thickness of one or more layers prior to curing the material by evening the dispensed material to remove excess material and create a uniformly smooth exposed or flat up-facing surface on the support platform of the printer.

The foregoing techniques can be repeated a selected number of times to provide the 3D article. For example, in some cases, this process can be repeated "n" number of times. Further, it is to be understood that one or more steps of a method described herein, such as a step of selectively applying energy to a layer of photopolymerizable composition, can be carried out according to an image of the 3D article in a computer-readable format. Suitable stereolithography printers include the Viper Pro SLA, available from 3D Systems, Rock Hill, South Carolina; the Asiga PICO PLUS 39, available from Asiga USA, Anaheim Hills, California; the D30, available from Rapid Shape, Heimsheim, Germany; and the Moonray, available from SprintRay, Los Angeles, California.

Figure 21:
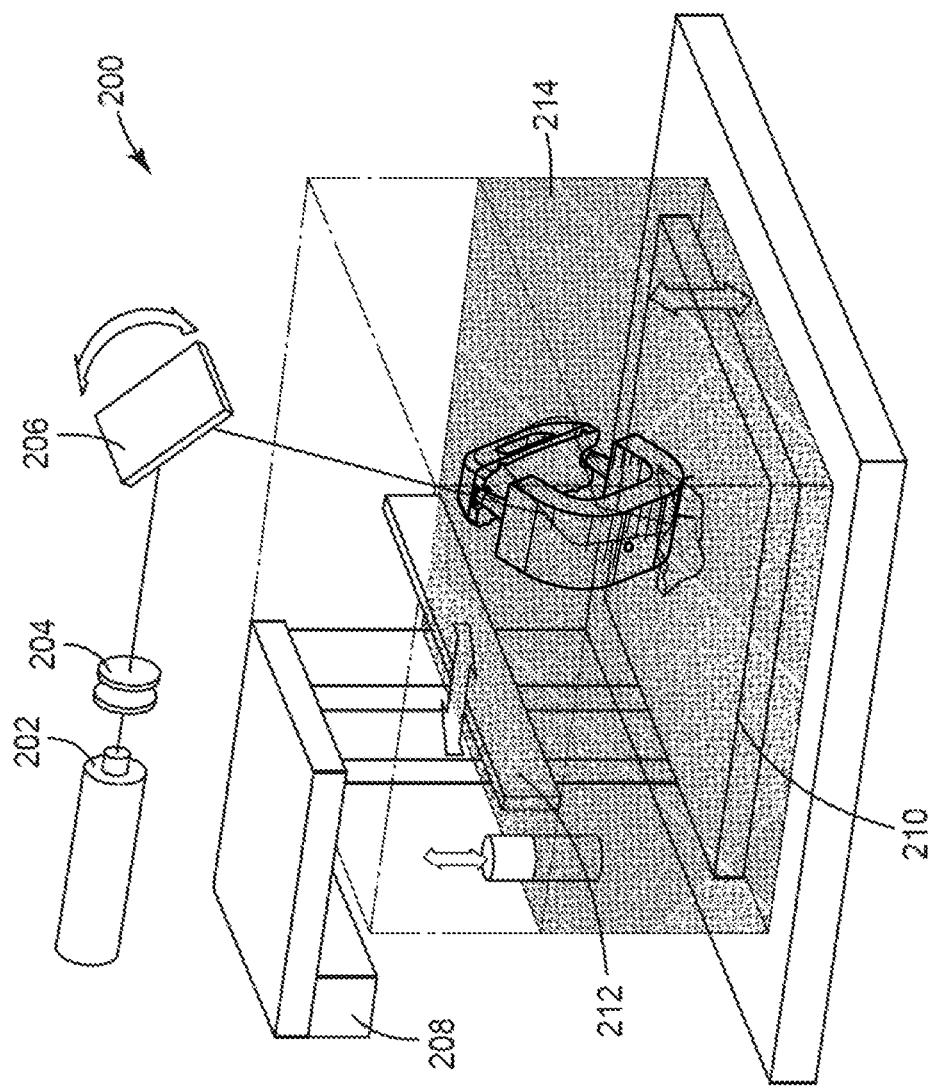
FIG. 21 is a generalized schematic of a stereolithography apparatus.

FIG. 21 shows an example stereolithography apparatus ("SLA") that may be used with the photopolymerizable compositions and methods described herein. In general, the SLA 200 may include a laser 202, optics 204, a steering lens 206, an elevator 208, a platform 210, and a straight edge 212, within a vat 214 filled with the photopolymerizable composition. In operation, the laser 202 is steered across a surface of the photopolymerizable composition to cure a cross-section of the photopolymerizable composition, after which the elevator 208 slightly lowers the platform 210 and another cross section is cured. The straight edge 212 may sweep the surface of the cured composition between layers to smooth and normalize the surface prior to addition of a new layer. In other examples, the vat 214 may be slowly filled with liquid resin while an article is drawn, layer by layer, onto the top surface of the photopolymerizable composition.

A related technology, vat polymerization with Digital Light Processing ("DLP"), also employs a container of curable polymer (e.g., photopolymerizable composition).

However, in a DLP based system, a two-dimensional cross section is projected onto the curable material to cure the desired section of an entire plane transverse to the projected beam at one time. All such curable polymer systems as may be adapted to use with the photopolymerizable compositions described herein are intended to fall within the scope of the term "vat polymerization system" as used herein.

Other techniques for three-dimensional manufacturing, including but not limited to fused deposition modeling, selective laser sintering, and inkjet printing, may be suitably adapted to the techniques described herein. More generally, three-dimensional fabrication techniques continue to become available and may be adapted to use with photopolymerizable compositions described herein, provided they offer compatible fabrication viscosities and resolutions for the specified article properties, for instance continuous additive manufacturing in which a build plate is (essentially) continuously moved through a vat of photopolymerizable material. In certain examples, an apparatus adapted to be used in a continuous mode may be employed, such as an apparatus commercially available from Carbon 3D, Inc. (Redwood City, CA), for instance as described in U.S. Pat. Nos. 9,205,601 and 9,360,757 (both to DeSimone et al.). For example, in any method described above, selective curing of a photopolymerizable material includes continuous photopolymerization of at least one of the first portion of the article or the second portion of the article.

Fabrication may be performed using any of the fabrication technologies described herein, either alone or in various combinations, using data representing a three-dimensional object, which may be reformatted or otherwise adapted as necessary for a particular printing or other fabrication technology. After an article has been formed, it is typically removed from the additive manufacturing apparatus. At this stage, the three-dimensional article typically has sufficient green strength for handling in any remaining steps of the method. The article surface, as well as the bulk article itself, typically still retain uncured material, suggesting a need for further curing. Removing residual uncured photopolymerizable material is particularly useful when the article is going to subsequently be post-cured, to minimize uncured residual material from undesirably curing directly onto the article. A "cured" article can include a photopolymerizable material that has been at least partially polymerized and/or crosslinked. For instance, in some instances, an at least partially polymerized article is at least about 10% polymerized or crosslinked or at least about 30% polymerized or crosslinked. In some cases, an at least partially polymerized article is at least about 50%, at least about 70%, at least about 80%, or at least about 90% polymerized or crosslinked, for instance between about 10% and about 99% polymerized or crosslinked.

In some examples, removal of excess uncured photopolymerizable composition on the additive manufactured article is at least partially performed by washing with at least one solvent. Suitable solvents include, but are not limited to, propylene carbonate, isopropanol, methanol, di(ethylene glycol) ethyl ether, tripropylene glycol monomethyl ether, diethylene glycol monobutyl ether, a blend of dipropylene glycol monomethyl ether with [2-(2-methoxymethylethoxy) methylethoxy]propanol, and combinations thereof. In certain examples, the removal is performed at least partially by moving the additive manufactured article and thereby generating a mass inertial force in uncured photopolymerizable composition on the article, wherein the mass inertial force is generated using a centrifuge, a shaker, or a mixer that spins along one or more axes. Suitable ways of generating a mass inertial force are described, for instance, in International Publication No. 2020/157598 (Chakraborty et al.)), incorporated herein by reference in its entirety. For instance, the source of the mass inertial force may be generated using a centrifuge, a shaker, or a mixer that spins along one or more axes. In some examples, the moving of the object is a rotation or spinning of the object. Accordingly, the mass inertial force may be generated by a centrifugal force. One suitable mixer that spins along more than one axis is a dual asymmetric centrifugal mixer, such as the DAC 400 FVZ available from Flacktek, Landrum, SC. A dual asymmetric centrifugal mixer provides simultaneous dual axis spinning that automatically reorients the article during spinning, which tends to pull uncured composition out of concave features of the article in a short period of time (e.g., 20, 15, or 10 seconds or less).

The technique also may include subjecting the additive manufactured article to actinic radiation, heat, or both to photopolymerize uncured photopolymerizable composition. Optionally, that can be followed by soaking the article with another solvent (e.g., diethylene glycol ethyl ether or ethanol). Exposure to actinic radiation can be accomplished with any convenient radiation source, generally UV radiation, visible radiation, and/or e-beam radiation, for a time ranging from about 10 seconds to over 60 minutes. Heating is generally carried out at a temperature in the range from about 35° C. to about 80° C., for a time ranging from about 10 to over 60 minutes in an inert atmosphere. In some examples, post-cure ovens, which combine UV radiation and thermal energy, may be used for post-cure processes. In some examples, post curing may improve the mechanical properties and stability of the three-dimensional article relative to the same three-dimensional article that is not post cured.

In some examples, the photopolymerizable material includes a ceramic material (e.g., ceramic particles and/or ceramic fibers), and the method further includes burning out polymerized material and sintering the additive manufactured article to form a ceramic article.

Regarding any method described above, the steps further optionally include polishing the additive manufactured article, to render at least a portion of a surface of the additive manufactured article smoother than prior to the polishing.

Figure 15:
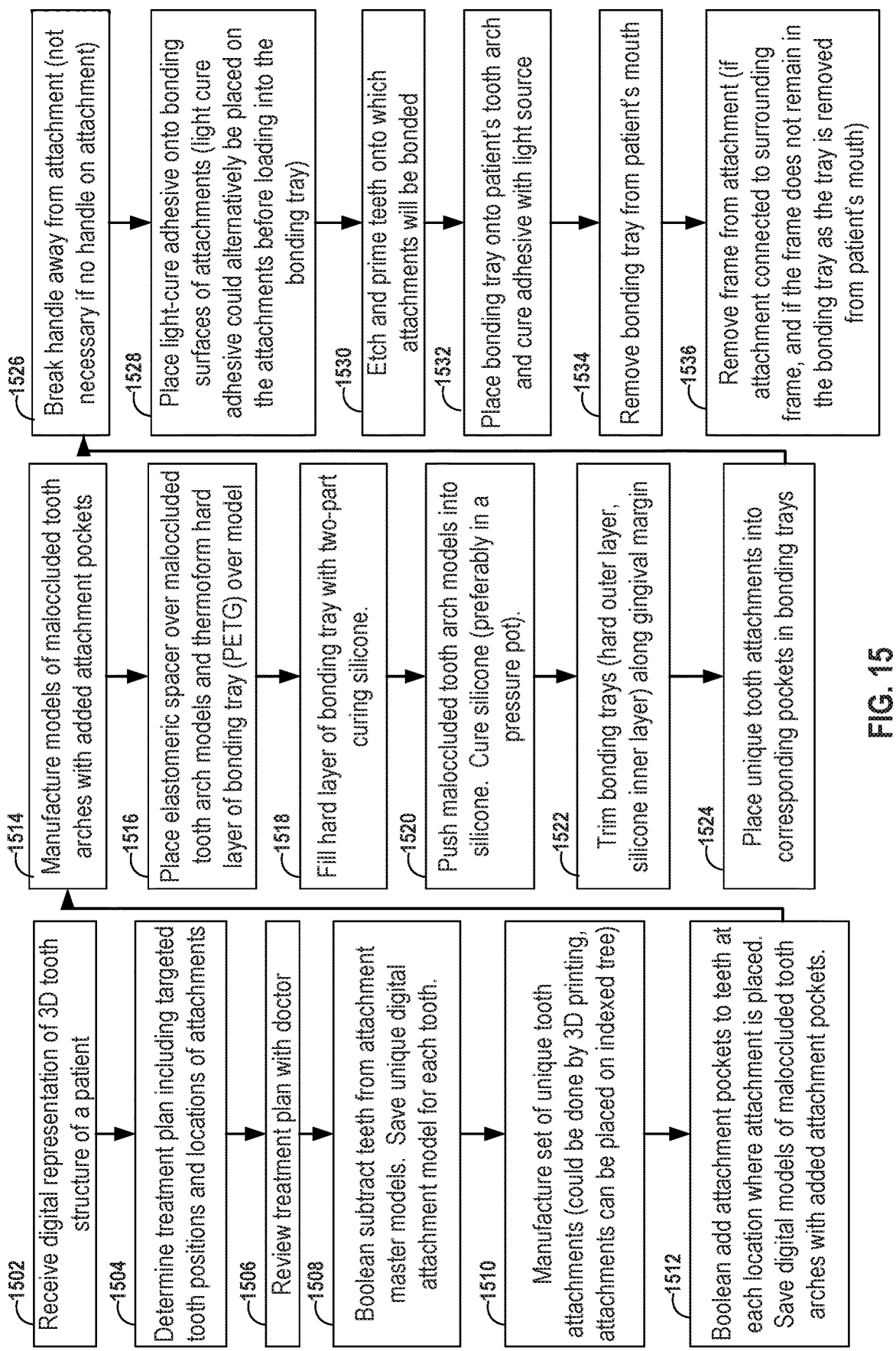
FIG. 15 is a flow chart of an example technique of making and using an additive manufactured article including an attachment body, a coupling portion, and a bonding surface.

FIG. 15 is a flow chart of an example technique of making and using an additive manufactured article. The technique illustrated in FIG. 15 includes receiving a digital representation of 3D tooth structure of a patient (1502). Data representing an article may be generated using computer modeling, such as computer aided design (CAD) data. Image data representing the article design can be exported in STL format, or in any other suitable computer processable format, to the additive manufacturing equipment. Scanning methods to scan a three-dimensional object may also be employed to create the data representing the article. One example technique for acquiring the data is digital scanning. Any other suitable scanning technique may be used for scanning an article, including X-ray radiography, laser scanning, computed tomography (CT), magnetic resonance imaging (MRI), and ultrasound imaging. Other possible scanning methods are described, e.g., in U.S. Patent Publication No. 2007/0031791 (Cinader, Jr., et al.). The initial digital data set, which may include both raw data from scanning operations and data representing articles derived from the raw data, can be processed to segment an article design from any surrounding structures (e.g., a support for the article).

Figure 20:
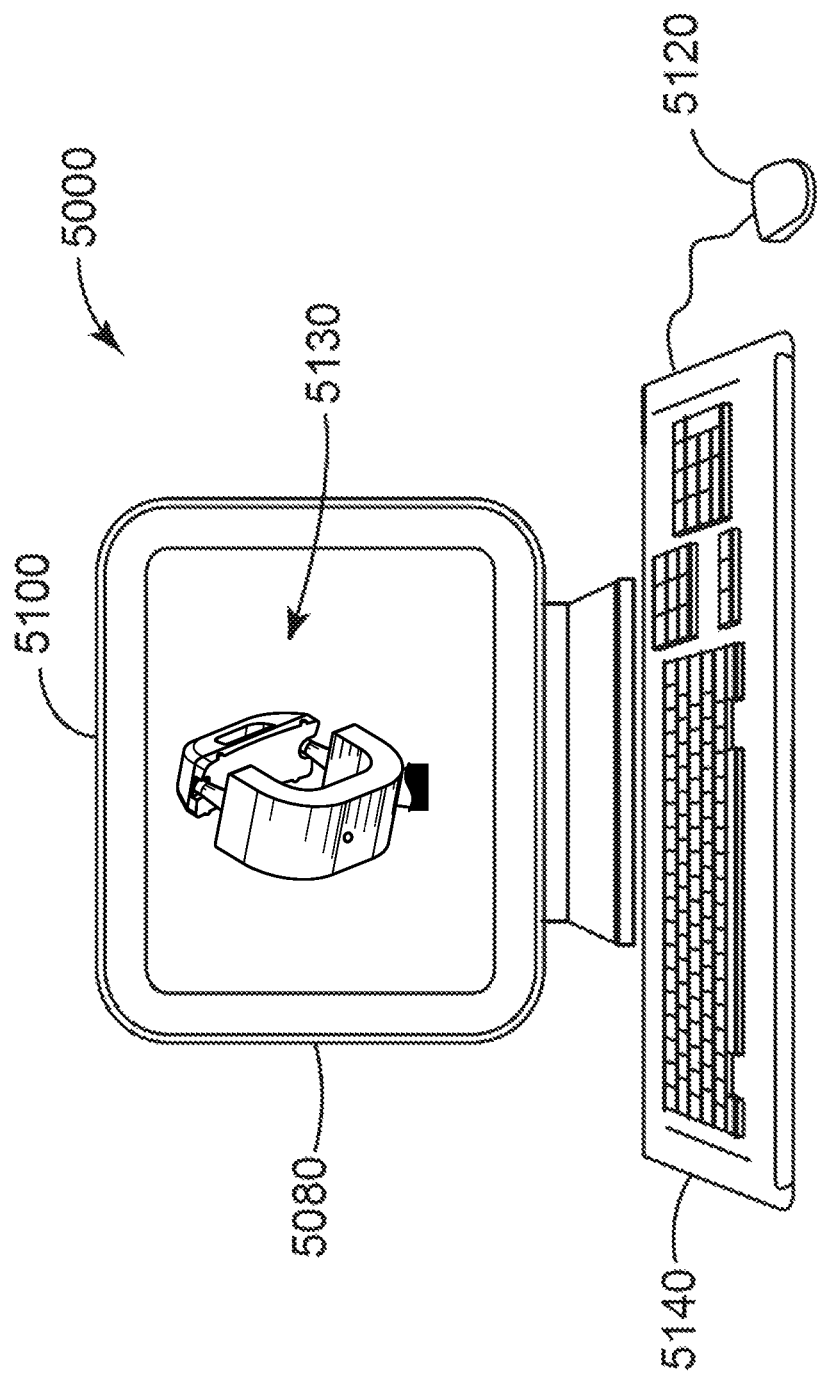
FIG. 20 is a schematic front view of an example computing device.

Often, machine-readable media are provided as part of a computing device. The computing device may have one or more processors, volatile memory (RAM), a device for reading machine-readable media, and input/output devices, such as a display, a keyboard, and a pointing device. Further, a computing device may also include other software, firmware, or combinations thereof, such as an operating system and other application software. A computing device may be, for example, a workstation, a laptop, a tablet, a smart phone, a personal digital assistant (PDA), a server, a mainframe or any other general-purpose or application-specific computing device. A computing device may read executable software instructions from a computer-readable medium (such as a hard drive, a CD-ROM, or a computer memory), or may receive instructions from another source logically connected to computer, such as another networked computer. Referring to FIG. 20, a computing device 5000 often includes an internal processor 5080, a display 5100 (e.g., a monitor), and one or more input devices such as a keyboard 5140 and a mouse 5120. In FIG. 20, an article 5130 is shown on the display 5100.

The technique illustrated in FIG. 15 also includes determining a treatment plan including targeted tooth positions and locations of attachments (1506). For example, computing device 5000 executing 3D modeling software may render a resultant digital representation of the tooth structure, including the occlusal surface as well as the root structure of the patient's dental arch. Modeling software provides a user interface (e.g., a display 5100, keyboard 5140, and mouse 5120) that allows the practitioner to manipulate digital representations of the teeth in 3D space relative to the digital representation of the dental arch of the patient. By interacting with the computer system, the practitioner generates treatment information, such as by selecting indications of the final positions of individual teeth of the patient, duration of a respective stage of treatment, or number of treatment stages, the direction or magnitude of forces on the teeth of the patient during a stage of treatment, or the like. For example, the final positions of individual teeth of the patient, duration of a respective stage of treatment, or number of treatment stages may affect the direction or magnitude of forces on the teeth of the patient at each stage of treatment by each removable dental appliance of the set of removable dental appliances. In some examples, orthodontic attachments may be used during at least one, but fewer than all stages of treatment. In some examples, the movements to be achieved, the forces applied, and the engagement of each tooth by each removable dental appliance of the set of removable dental appliances may be determined by selecting the dimensions, shapes, and positions of the orthodontic attachments and/or shells of a removable dental appliance. In this way, updating a database with diagnostic and treatment information may include determining or selecting by a clinician, a technician, or automatically by a computer the dimensions, shapes, and positions of the attachments and/or shells of each of removable dental appliance of the set of removable dental appliances to result in the desired movement of the teeth of the patient. In some examples, the technique optionally includes reviewing, e.g., by a dentist, clinician, or other technician, the treatment plan (1506).

The technique illustrated in FIG. 15 also includes modifying the digital tooth data to Boolean subtract teeth from the 3D model of the teeth and saving the unique digital attachment model for each tooth (1508). In this way, computing device 5000 may be configured to identify a unique shape for a plurality of attachments, each attachment identified as corresponding to a particular tooth.

The technique illustrated in FIG. 15 also includes manufacturing, based on the determined unique digital attachments model for each tooth, a set of unique tooth attachments, e.g., articles (1510). As discussed above, manufacturing the tooth attachments may include three-dimensional printing. In other example, manufacturing the attachments may include other methods, such as, for example, injection molding or subtractive manufacturing (e.g., milling). In some examples, a plurality of articles may be formed on a single build platform and, optionally, labeled with indicia.

The technique illustrated in FIG. 15 also includes modifying the digital tooth data to Boolean add attachment pockets to teeth at each location where attachment is placed and saving digital models of maloccluded tooth arches with added attachment pockets (1512). As discussed above, a transfer tray includes shells configured to receive a selected number of teeth and recesses (e.g., pockets) within selected shells to receive an attachment body. In some examples, the recesses are configured to receive only an attachment body, an attachment body and a coupling portion (e.g., frame), and/or a portion of a handling tool (e.g., arms of a tweezers).

The technique illustrated in FIG. 15 optionally includes manufacturing models of maloccluded tooth arches with added attachment pockets (1514). Manufacturing the models of maloccluded tooth arches with added attachment pockets may include three-dimensional printing. In other example, manufacturing the models of maloccluded tooth arches with added attachment pockets may include other manufacturing methods, such as, for example, injection molding or subtractive manufacturing (e.g., milling).

The technique illustrated in FIG. 15 optionally includes placing elastomeric spacer over maloccluded tooth arch models and thermoforming hard layer of transfer tray (such as, for example, PETG) the models of maloccluded tooth arches with added attachment pockets (1516). In other example, rather than manufacturing the models of maloccluded tooth arches with added attachment pockets and thermoforming the transfer tray, the technique may include additive manufacturing of the transfer tray.

The technique illustrated in FIG. 15 also includes removing the elastomeric spacer and filling the hard layer of transfer tray with two-part curing silicone (1518). The technique illustrated in FIG. 15 also includes pushing maloccluded tooth arch models into silicone and curing the silicone, such as, for example, using a pressure pot (1520). In other examples, the technique may include forming the relatively soft layer of the transfer tray using additive manufacturing techniques. In some examples, the relatively soft layer may be formed first over the maloccluded tooth arch model, and the relatively hard layer formed over the relatively soft layer. The technique illustrated in FIG. 15 also includes trimming the transfer trays (e.g., hard outer layer, silicone inner layer, or both) along gingival margin (1522).

After forming the transfer tray, the technique illustrated in FIG. 15 includes placing the unique tooth attachments into corresponding pockets in transfer trays (1524). For example, a clinician or technician may use a tool such as a tweezer, a retaining ring pliers, or other suitable tool to engage a coupling portion of an article to insert at least an attachment body into a respective recess in the transfer tray. In some examples, placing the attachments may include placing, by a pick-and-place robot, the attachments in the transfer tray. In this way, forming the transfer tray may be automated. The technique illustrated in FIG. 15 optionally includes breaking a coupling portion from the attachment body (1526).

The technique illustrated in FIG. 15 also includes placing a light-cure adhesive onto bonding surfaces of attachments (1528). In some examples, the light-cure adhesive could be placed on the attachments before loading into the transfer tray. In some examples, other dental adhesives may be used, and the technique may include proper preparation and use of those adhesives (e.g., mixing of two part adhesives, application of curing agent, or the like).

The technique illustrated in FIG. 15 optionally includes etching and priming teeth onto which attachments will be bonded (1530). In some examples, etching and priming may improve bonding of the attachments to the teeth.

The technique illustrated in FIG. 15 also includes placing the transfer tray onto the dental arch and curing the adhesive (1532). For example, curing the adhesive may include curing with a light source, such as a dental irradiation device, curing with an activating agent, and/or waiting a duration of time.

The technique illustrated in FIG. 15 also includes removing the transfer tray from patient's mouth (1534). The technique illustrated in FIG. 15 optionally includes removing coupling portions from the attachment bodies, for example, if the coupling portion is not removed before placing the body within the transfer tray and/or does not remain in the transfer tray as the tray is removed from patient's mouth (1536).

The technique illustrated in FIG. 15 may include fewer steps or additional steps. For example, the technique may include any one or more steps for generating digital dental anatomy data, communicating digital dental anatomy data, and/or determining a treatment plan as discussed in International Patent Publication No. WO2020/099990 (Domroese), the entire contents of which is incorporated herein by reference. For another example, the technique may omit the step of manufacturing physical models of maloccluded tooth arches with added attachment pockets (1514) and instead directly create a transfer tray through additive manufacturing techniques.

Figure 16:
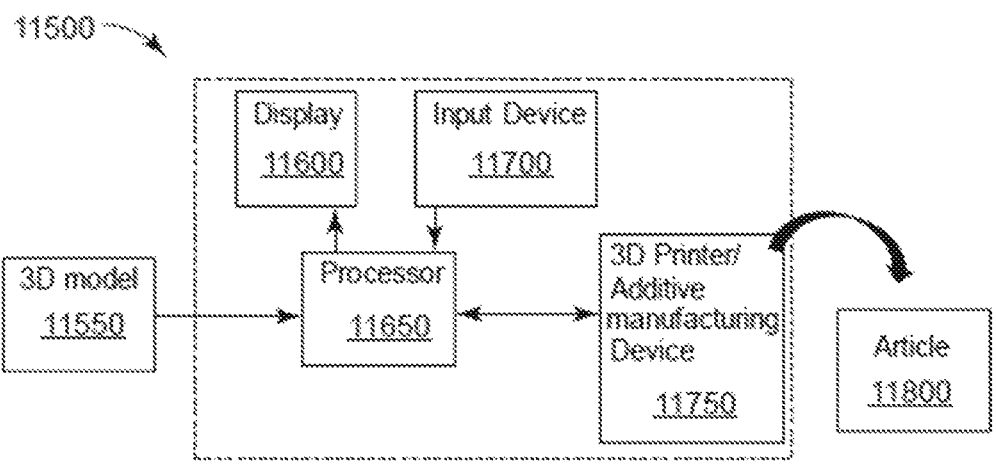
FIG. 16 is a block diagram of a generalized system for additive manufacturing of an article.

Referring to FIG. 16, in certain examples, the present disclosure provides a system 1150. The system 11500 includes a display 11600 that displays a 3D model 11550 of an article (e.g., an article 5130 as shown on the display 5100 of FIG. 15); and one or more processors 11650 that, in response to the 3D model 11550 selected by a user, cause an additive manufacturing device 11750 to create a physical object of the article 11800. Often, an input device 11700 (e.g., keyboard and/or mouse) is employed with the display 11600 and the at least one processor 11650, particularly for the user to select the 3D model 11550. The article 11800 includes a body defining a retaining member configured to retain the attachment in a recess defined by a body of a transfer tray; a coupling portion configured to engage a tool for insertion of the attachment into the recess; and a bonding surface configured to bond the attachment to a portion of an outer surface of a tooth of a patient.

Figure 17:
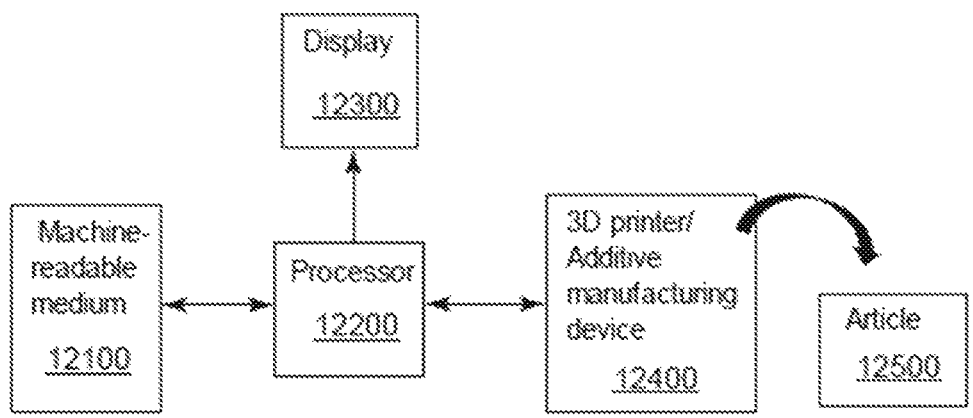
FIG. 17 is a block diagram of a generalized manufacturing process for an article.

Referring to FIG. 17, a processor 12200 (or more than one processor) is in communication with each of a machine-readable medium 12100 (e.g., a non-transitory medium), an additive manufacturing device 12400, and optionally a display 12300 for viewing by a user. The additive manufacturing device 12400 is configured to make one or more articles 12500 based on instructions from the processor 12200 providing data representing a 3D model of the article 12500 (e.g., an article 5130 as shown on the display 5100 of FIG. 20) from the machine-readable medium 12100.

Figure 18:
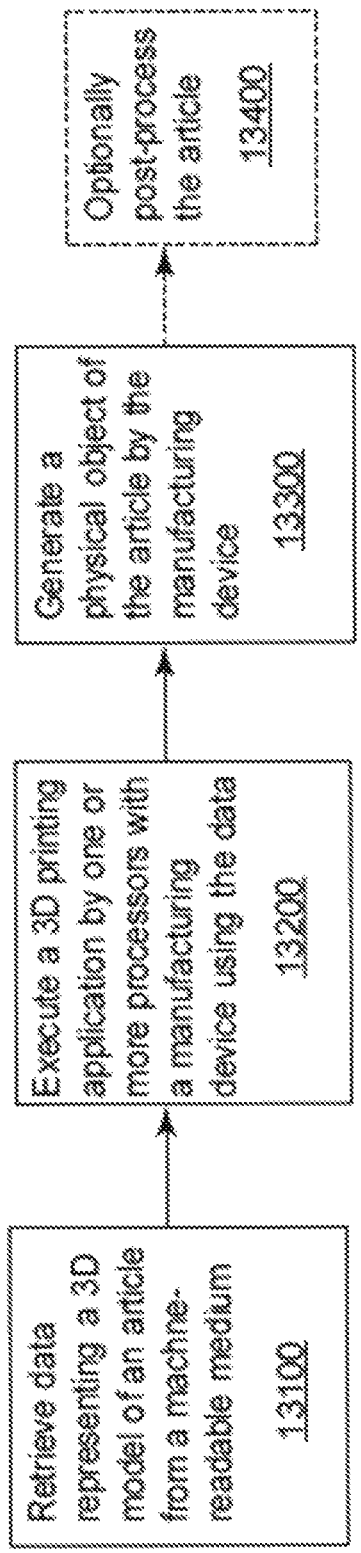
FIG. 18 is a high-level flow chart of an example article manufacturing process.

As illustrated in FIG. 18, in some examples, an additive manufacturing technique may include retrieving 13100, from a (e.g., non-transitory) machine-readable medium, data representing a 3D model of an article according to at least one embodiment of the present disclosure. The method further includes executing 13200, by one or more processors, an additive manufacturing application interfacing with a manufacturing device using the data; and generating 13300, by the manufacturing device, a physical object of the article. One or more various optional post-processing steps 13400 may be undertaken. Typically, the article is at least cleaned with solvent and dried, plus may further be heat treated and/or sintered.

Figure 19:
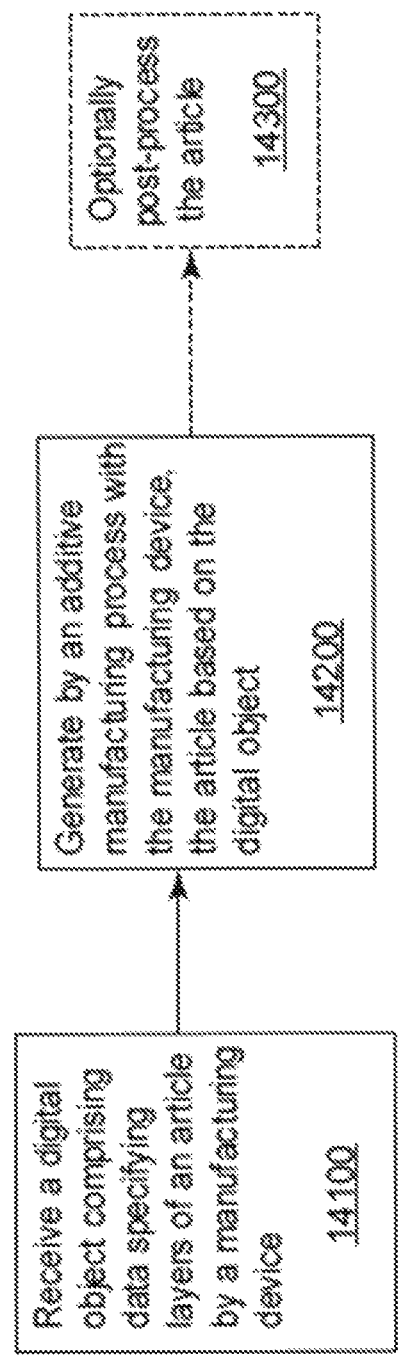
FIG. 19 is a high-level flow chart of an example article additive manufacturing process.

As illustrated in FIG. 19, in some examples, an additive manufacturing technique may include receiving 14100, by a manufacturing device having one or more processors, a digital object including data specifying an article; and generating 14200, with the manufacturing device by an additive manufacturing process, the article based on the digital object. As discussed above, the technique may include one or more steps of post-processing 14300

What is claimed is:

1. An orthodontic article comprising: an orthodontic attachment including:
    a body defining a retaining member configured to retain the orthodontic attachment in a recess defined by a shell of a transfer tray, and
    a bonding surface configured to bond the orthodontic attachment to a portion of an outer surface of a tooth; and
    a coupling portion including at least one frangible section configured for engaging the body and orienting the bonding surface in a direction relative to a plane defined by the coupling portion, wherein a portion of the at least one frangible section comprises a connection point to the body, and wherein the at least on frangible section is configured to break at a surface of the body.

2. The orthodontic article of claim 1, wherein the body has a shape configured to transfer a force from a clear tray aligner to the tooth.

3. The orthodontic article of claim 1, wherein the body defines the coupling portion.

4. The orthodontic article of claim 1, wherein the coupling portion is integrally formed with the body.

5. The orthodontic article of claim 1, wherein the orthodontic article comprises at least one of a ceramic material, a polymeric material, or a polymer composite.

6. The orthodontic article of claim 1, wherein the retaining member comprises an undercut configured to retain the body within the recess.

7. The orthodontic article of claim 1, wherein the coupling portion comprises a vestige of the at least one frangible section configured to extend from the body.

8. The orthodontic article of claim 1, wherein the bonding surface is parallel to an outer surface of the coupling portion.

9. The orthodontic article of claim 1, wherein the bonding surface is oriented to face towards the coupling portion.

10. The orthodontic article of claim 1, wherein the coupling portion defines a continuous or partial perimeter around the body.

11. A system for indirect bonding of orthodontic attachments, the system comprising:
    a bonding appliance body defining a shell configured to receive an outer surface of a tooth of a patient, wherein the bonding appliance body defines a recess within the shell; and an orthodontic article comprising:
  a body defining a retaining member configured to retain an orthodontic attachment in the recess of the bonding appliance body;
  a bonding surface of the orthodontic attachment configured to bond the body of the orthodontic article to a portion of the outer surface of the tooth; and
  a coupling portion forming at least a partial perimeter about the body of the orthodontic article, wherein the coupling portion includes a plurality of frangible sections each comprising a respective connection point to the body of the orthodontic article,
  wherein the at least one frangible section is configured to orient the bonding surface in a direction relative to a plane defined by the coupling portion.

12. The system of claim 11, wherein the retaining member comprises an undercut or a protrusion relative to a surface defined by the body of the orthodontic article.

13. The system of claim 11, wherein the coupling portion comprises at least one handling recess configured to receive one or more arms of a handling tool.

14. The system of claim 11, wherein the body of the orthodontic article defines a buccal facing surface, a labial facing surface, or a lingual facing surface, and wherein the buccal facing surface, the labial facing surface, or the lingual facing surface defines a negative draft tapered toward the bonding surface.

15. The system of claim 11, wherein the bonding appliance body defines at least one pocket adjacent the recess and shaped to receive at least a portion of a handling tool when positioning the orthodontic attachment in the recess.

16. The system of claim 11, wherein the bonding appliance body defines a plurality of shells, each respective shell of the plurality of shells configured to receive a respective tooth of a plurality of teeth, wherein the bonding appliance body defines a respective recess within at least two respective shells.

17. The system of claim 11, wherein the recess is configured to position the bonding surface relative to the bonding appliance body to define a recess configured to receive an adhesive for bonding of the orthodontic attachment to the outer surface of the tooth.

18. A kit comprising:
  an orthodontic article comprising:
    a body defining a retaining member configured to retain an orthodontic attachment in a recess defined by a shell of a transfer tray;
    a coupling portion configured to be engageable for insertion of the orthodontic attachment into the recess of the transfer tray, wherein the coupling portion includes a plurality of frangible sections each comprising a respective connection point to the body of the orthodontic article; and
    a bonding surface configured to bond the orthodontic attachment to a portion of an outer surface of a tooth; and
  a transfer tray comprising a body defining a shell configured to receive an outer surface of a tooth, wherein the body defines a recess within the shell, and wherein the transfer tray includes a tab configured to engage the retaining member.

19. The kit of claim 18, wherein the bonding surface includes an adhesive.

20. The kit of claim 18, wherein the transfer tray defines at least one pocket adjacent the recess, the at least one pocket shaped to receive at least a portion of a handling tool when positioning the orthodontic attachment in the recess.

* * * * *